(12) United States Patent
Kangas et al.

(10) Patent No.: US 8,755,816 B2
(45) Date of Patent: Jun. 17, 2014

(54) METHOD AND APPARATUS FOR POSITION DETERMINATION IN A CELLULAR COMMUNICATIONS SYSTEM

(75) Inventors: Ari Kangas, Lidingö (SE); Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 733 days.

(21) Appl. No.: 12/881,611

(22) Filed: Sep. 14, 2010

(65) Prior Publication Data

US 2011/0159886 A1 Jun. 30, 2011

Related U.S. Application Data

(60) Provisional application No. 61/291,101, filed on Dec. 30, 2009.

(51) Int. Cl.
*H04W 24/00* (2009.01)

(52) U.S. Cl.
USPC ..................... 455/456.1; 455/456.5

(58) Field of Classification Search
USPC ............ 455/456.1, 456.5, 440, 456.2, 456.3, 455/456.4, 456.6, 457, 403; 342/450
See application file for complete search history.

(56) References Cited

U.S. PATENT DOCUMENTS

| | | | |
|---|---|---|---|
| 2001/0022558 A1* | 9/2001 | Karr et al. ...................... 342/450 |
| 2010/0232362 A1* | 9/2010 | Tenny ........................... 370/328 |

OTHER PUBLICATIONS

Wigren_WO_2007-043915_A1.pdf.*
Agilent Technologies, "Functional A-GPS Receiver Test Using 8960 Wireless Communications Test Set and E4438C ESG Vector Signal Generator," pp. 1-9.
Djuknic, G. M., et al., "Geolocation and Assisted GPS," Communications, Feb. 2011, pp. 123-125.
Harper, N., et al., "Process for Improving APS Acquisition Assistance Data and Server-Side Location Determination for Cellular Networks," The 2004 International Symposium on GNSS/GPS, Dec. 2004.
Technical Specification, 3$^{rd}$ Generation Partnership Procject: Technical Specification Group Services and Systems Aspects; Universal Geographical Area Description (GAD) (Release 9), 3GPP TS 23.032, V9.0.0, Dec. 2009.
Shi, L., et al., "AECID Fingerprinting Positioning Performance," GLOBECOM, 2009.

(Continued)

*Primary Examiner* — Kwasi Karikari
*Assistant Examiner* — Alexander Yi
(74) *Attorney, Agent, or Firm* — Nixon & Vanderhye, P.C.

(57) ABSTRACT

A scaling apparatus and method scales uncertainty criteria (horizontal and vertical accuracy requirements) originally received from an end user before the uncertainty criteria is sent on to a wireless terminal (30) as requirements on the accuracy of location positioning performed by/for the wireless terminal. In an example embodiment the amount/degree of scaling is selected according to a configured best estimate of the confidence and uncertainty relation, and such best estimate can be based on the majority of the terminals of the network. For a WCDMA radio access network (RAN) case the scaling can be performed in a radio network controller (RNC). For a Long Term Evolution (LTE) radio access network (RAN) case the scaling can be performed in the evolved Serving Mobile Location Center (eSMLC) node. In another case the scaling can alternatively be performed in the wireless terminal itself.

21 Claims, 12 Drawing Sheets

(56) References Cited

OTHER PUBLICATIONS

Technical Specification, 3$^{rd}$ Generation Partnership Project: Technical Specification Group Radio Access Network; UTRAN Iu interface Radio Access Network Application Part (RANAP) signaling (Release 9), 3GPP TS 25.413, V9.4.0, Sep. 2010.

Technical Specification, 3$^{rd}$ Generation Partnership Project; Technical Specification Group Radio Access Network; Radio Resource Control (RRC); Protocol Specification (Release 9); 3GPP TS 25.331 V9.4.0 Sep. 2010.

Technical Specification, 3$^{rd}$ Generation Partnership Project; Technical Specification Group Core Network and Terminals; Location Services (LCS); Evolved Packet Core (EPC) LCS Protocol (ELP) between the Gateway Mobile Location Centre (GMLC) and the Mobile Management Entity (MME); SLg Interface (Release 9); 3GPP TS 29.172, V9.1.0, Jun. 2010.

Technical Specification, 3$^{rd}$ Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); SLs interface (Release 9); 3GPP TS 29.171, V9.1.0, Jun. 2010.

Andrew Solutions, Location Services for Long Term Evolution, White Paper, pp. 1-20, WP-103492-EN (Oct. 2009).

International Preliminary Report on Patentability and Written Opinion issued in International Application No. PCT/IB2010/055484 dated Jul. 4, 2012.

\* cited by examiner

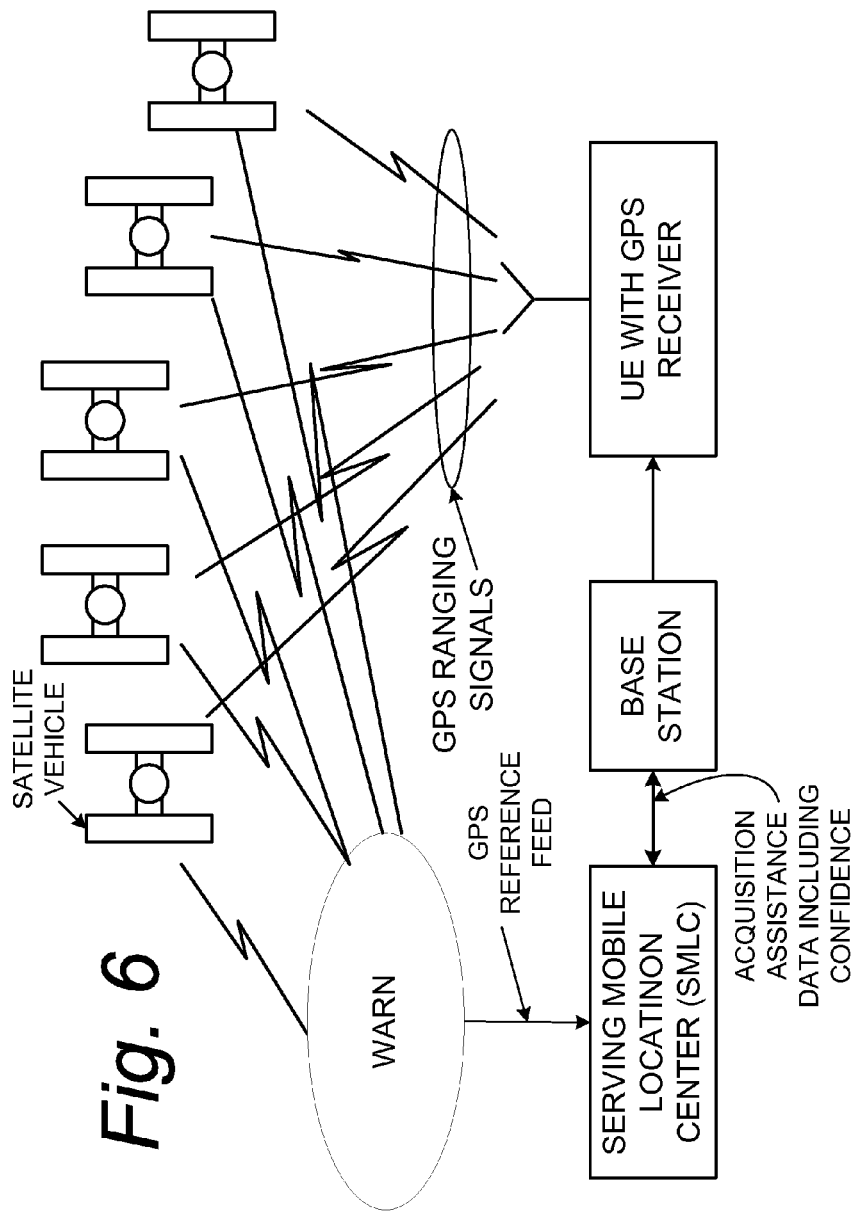

| POLYGON REPORTING FORMAT | |
|---|---|
| POSITION (IMPLICITLY PROVIDES UNCERTAINTY) [70] | CONFIDENCE [74] |

*Fig. 7A*

| ELLIPSOID POINT WITH UNCERTAINTY CIRCLE REPORTING FORMAT | | |
|---|---|---|
| POSITION [80] | UNCERTAINTY [82] | CONFIDENCE [84] |

*Fig. 7B*

| ACQUISTION ASSISTANCE DATA MESSAGE | | |
|---|---|---|
| INITIAL LOCATION ESTIMATE [90] | UNCERTAINTY OF ESTIMATE [92] | CONFIDENCE OF ESTIMATE [94] |

*Fig. 7C*

METHOD AND APPARATUS FOR POSITION DETERMINATION IN A CELLULAR COMMUNICATIONS SYSTEM

This application claims the priority and benefit of U.S. Provisional Patent Application 61/291,101, filed Dec. 30, 2009, entitled "METHOD AND APPARATUS FOR POSITION DETERMINATION IN A CELLULAR COMMUNICATIONS SYSTEM", which is incorporated herein by reference in its entirety.

TECHNICAL FIELD

This invention pertains to telecommunications, and in particular to methods and apparatus for determining and/or reporting a position of a terminal such as a wireless terminal.

BACKGROUND

Determination of position location can be important for many different types of equipment, particularly for mobile units or vehicles. For example, determination of position location can allow the user of the mobile unit or vehicle to ascertain the user's whereabouts, enabling the user to make appropriate navigation or other decisions. In addition, when provided to a third party, information regarding position location of a mobile unit or vehicle can enable the third party to locate and provide assistance or render service to the user.

1.0 Radio Access Networks

One example of a mobile unit for which position location can be important is a wireless terminal of a telecommunications system. In fact, governmental agencies of some countries mandate that communication carriers provide emergency service providers with highly accurate information of mobile units in a timely manner. An example of such requirement is the United States Federal Communications Commission E-911 mandate.

In a typical cellular radio system, such wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS). In some networks a base station may also be called a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs).

In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Serving Gateways, or SGWs) rather than to radio network controller (RNC) nodes. In general, in LTE the functions of a radio network controller (RNC) node are distributed between the radio base stations nodes (eNodeB's in LTE) and SGWs. As such, the radio access network (RAN) of an LTE system has an essentially "flat" architecture comprising radio base station nodes without reporting to radio network controller (RNC) nodes.

2.0 Positioning Methods

There are several positioning methods which can be used to determine the position of a wireless terminal. Among such positioning methods are Assisted GPS (A-GPS), Observed Time Difference of Arrival (OTDOA), and Adaptive Enhanced Cell ID (AECID). Each of these positioning methods is described briefly below.

2.1 A-GPS

Assisted GPS (A-GPS) positioning is an enhancement of the global positioning system (GPS). A-GPS allows much faster location by using more precise positioning information obtained from stations (e.g., base stations) that monitor GPS satellites essentially constantly. This information is called "assistance data" or "acquisition assistance data" and allows the wireless terminal to determine and report back to the network its location within seconds. GPS reference receivers attached to a cellular communication system collect assistance data that, when transmitted to GPS receivers in terminals connected to the cellular communication system, enhance the performance of the GPS terminal receivers.

There are two basic types of A-GPS. One type, denoted "UE-based A-GPS", relies on the user equipment unit (UE) for calculation of the position. The position is reported back to the eNodeB and a node known as the evolved Serving Mobile Location Center (eSMLC) using one of several possible 3GPP reporting formats (some 3GPP reporting formats are discussed below). Another type, denoted "UE-assisted A-GPS", relies on the wireless terminal (UE) to perform measurements of so called pseudo-ranges. The wireless terminal then reports said pseudo-range measurements back to the evolved Serving Mobile Location Center (eSMLC) where the position calculation is being performed. For UE-based A-GPS the point with uncertainty circle format is affected by a lack of confidence information.

2.2 OTDOA

The OTDOA positioning method that is currently being standardized in 3GPP for the LTE cellular system operates according to similar principles as A-GPS. The wireless terminal (UE) performs time of arrival measurements on signals from several neighbor eNodeBs, the signals being designed for positioning purposes. Since it is generally not assumed that the system is synchronized, the eNodeBs also perform measurements of the time of transmission of said signals. The distance from the eNodeB to the UE can be related to the time of arrival, the time of transmission and the unknown clock bias of the UE with respect to the cellular time base. Since the 2-dimensional (2D) coordinates of the UE are the sought unknowns, at least three such relations need to be established in order to be able to solve for said coordinates and the unknown clock bias. It is common practice to form pair-wise differences between such relations, thereby eliminating the clock bias which is the same in all equations. This generates time difference of arrival measurements.

There are two basic types of OTDOA methods. One type (denoted "UE-based OTDOA") relies on the user equipment unit (UE) or wireless terminal for calculation of the position. The position is reported back to the eNodeB and the eSMLC using one of the 3GPP reporting formats. Another type (denoted "UE-assisted OTDOA") relies on the user equipment unit (UE) or wireless terminal to perform time of arrival measurements. The wireless terminal then reports said difference time of arrival measurements back to the evolved Serving Mobile Location Center (eSMLC) where the position calculation is being performed. For UE-based OTDOA the point with uncertainty circle format is affected by a lack of confidence information. For the LTE cellular system the standard is yet limited to UE-assisted OTDOA.

2.3 AECID

Adaptive Enhanced Cell ID (AECID) is a fingerprinting positioning method. In the radio fingerprint mapping mode high precision reference positions of opportunity are generated either by A-GPS or OTDOA positioning. It can be noted that OTDOA provides high precision measurements also indoors. At the same time as the reference positions are obtained the AECID positioning method performs measurements of the radio conditions experienced by the wireless terminal, the measurements being denoted radio fingerprints. For Long Term Evolution (LTE), the radio fingerprinting measurements may consist of a subset of the serving cell ID, the timing advance value (TA), detected neighbor cell IDs, signal strengths/pathloss with respect to neighbor eNodeBs, as well as angle of arrival measurements. The radio fingerprint measurements are then processed further and combined in order to produce a radio fingerprint tag, associated with said high precision reference position. All tagged reference positions with the same tag are then collected in tagged clusters and stored, preferably in a hierarchical database. In a final step a 3GPP polygon is computed according to a certain algorithm that describes the boundary of said tagged cluster. The algorithm is described in T. Wigren, "Adaptive enhanced cell-ID fingerprinting localization by clustering of precise position measurements", IEEE Trans. Veh. Tech., vol 56, No. 5, pp. 3199-3209, 2007, which is incorporated by reference herein in its entirety. This tagged polygon is preferably stored in a hierarchical database. It is a special property of the algorithm that the polygons are computed to have a specific confidence, the confidence being determined from the live measured high precision measurements of said tagged cluster. When a positioning request is received in the positioning node, the list of own and neighbor cell IDs and the timing advance value are retrieved, and signal strength and angle of arrival measurements are performed and quantized. This information creates the tag of the terminal. The polygon that corresponds to the tag is collected from the database and reported. This is denoted the positioning mode.

3.0 Position Parameter Reporting

One or more of the aforementioned positioning methods require that certain general parameters be reported to a node or system which assists in or makes the determination of the wireless terminal location. For most positioning methods and situations the general parameters include a reported position parameter and a reported uncertainty parameter. For simplicity these two general parameters are also referenced herein as the "position" and "uncertainty".

3.1 Position

The "position" is generally considered to be a "point" at which the wireless terminal or UE is thought to be located. As explained hereinafter, position can be reported in one of several formats.

3.2 Uncertainty

Uncertainty can be reported in various ways, some of which are described below. In the 3GPP LTE specification, uncertainty can be reported in terms of an uncertainty circle, an uncertainty ellipse, an uncertainty ellipsoid, as well as by the reported regions themselves when the reported regions are given by the ellipsoid arc and polygon formats. See, e.g., 3GPP, TS 23.032, "Universal Geographical Area Description (GAD)", available at http://www.3gpp.org, incorporated herein by reference. Often uncertainty is expressed in terms of horizontal (horz) and vertical (vert) inaccuracies, the horizontal inaccuracy being used in a two dimensional (2D) case and both the horizontal inaccuracy and the vertical inaccuracy being used in a three dimensional (3D) case.

3.3 Confidence/Probability

Accuracy in the radio navigation field, particularly for A-GPS and OTDOA positioning in LTE, is a random quantity. In view of the randomness of accuracy, the uncertainty is sometimes accompanied with a corresponding probability or "confidence" that the terminal is actually in the region defined by the reported position and the reported uncertainty. Thus, for some positioning methods and situations a third parameter (known as the "probability" or "confidence" parameter) is also reported. The confidence parameter indicates the probability that the terminal is located in the interior of the reported region.

The ways the confidence parameter is obtained can differ for differing positioning methods. A reason that confidence parameters are obtained differently is due to use of different statistical models employed for the respective positioning methods. In A-GPS, inaccuracy is caused by a combination of pseudo-range measurement errors and geometrical effects. Due to the excess measurements employed with A-GPS, the law of large numbers together with a linearization provides a motivation for the standard Gaussian position error model. Also OTDOA preferably exploits the Gaussian uncertainty model. For AECID positioning the error is instead caused by radio coverage effects, so that a uniform statistical model for the terminal location is used for the AECID cases.

4.0 Location Reporting

Various messages involved with the determination of position location and reporting formats are now described. The following description assumes that UE-based versions of A-GPS or OTDOA are used for Long Term Evolution (LTE).

4.1 Downlink Messages

4.1.1 UMTS Downlink Messages

In the downlink the LOCATION REPORTING CONTROL message is obtained in the RNC over the RANAP interface. See, e.g., 3GPP, TS25.413, "UTRAN Iu interface RANAP signaling", available at http://www.3gpp.org, incorporated herein by reference. Also in the downlink, the MEASUREMENT CONTROL message is sent from the radio network controller (RNC) to the user equipment unit (UE). See, e.g., 3GPP, TS 25.331, "Radio Resource Control (RRC)", available at http://www.3gpp.org, incorporated herein by reference.

The LOCATION REPORTING CONTROL message and the MEASUREMENT CONTROL message each include an accuracy code and a vertical accuracy code. The accuracy code, representing horizontal accuracy, is expressed as a code value (0-127) that represents the radius of an uncertainty circle. The vertical accuracy code is expressed as a code value (0-127) that represents an altitude uncertainty in meters, encoded differently than the horizontal accuracy.

4.1.2 LTE Downlink Messages

In the downlink the GMLC sends a PROVIDE SUBSCRIBER LOCATION REQUEST message to the MME, see 3GPP TS 25,172 "Evolved Packet Core (EPC) LCS Protocol (ELP) between the Gateway Mobile Location Centre (GMLC) and the Mobile Management Entity (MME); SLg interface", available at http://www.3gpp.org, incorporated herein by reference. The MME sends the LOCATION REQUEST message to the E-SMLC, see 3GPP TS 25.171 "LCS Application Protocol (LCS-AP) between the Mobile Management Entity (MME) and Evolved Serving Mobile Location Centre (E-SMLC); SLs interface", available at http://www.3gpp.org, incorporated herein by reference. The E-SMLC sends the REQUEST LOCATION INFORMATION message to the UE, see 3GPP TS 36.335, "LTE Positioning Protocol (LPP)", available at http://www.3gpp.org, incorporated herein by reference.

The PROVIDE SUBSCRIBER LOCATION message, the LOCATION REQUEST message and the REQUEST LOCATION INFORMATION message each include an accuracy code and a vertical accuracy code. The accuracy code, representing horizontal accuracy, is expressed as a code value (0-127) that represents the radius of an uncertainty circle. The vertical accuracy code is expressed as a code value (0-127) that represents an altitude uncertainty in meters, encoded differently than the horizontal accuracy.

4.2 Uplink Messages

4.2.1 UMTS Uplink Messages

In the uplink the MEASUREMENT REPORT message is sent to the radio network controller (RNC) over the RRC interface. See, e.g., 3GPP, TS 25.331, "Radio Resource Control (RRC)", available at http://www.3gpp.org. Also in the uplink a LOCATION REPORT message is sent from the radio network controller (RNC) to the core network. See, e.g., 3GPP, TS25.413, "UTRAN Iu interface RANAP signaling", available at http://www.3gpp.org.

4.2.2 LTE Uplink Messages

In the uplink the user equipment unit (UE) sends the PROVIDE LOCATION INFORMATION message to the E-SMLC, see 3GPP TS 36.335, "LTE Positioning Protocol (LPP)", available at http://www.3gpp.org, incorporated herein by reference. The E-SMLC sends the LOCATION RESPONSE message to the MME, see 3GPP TS 25.171 "LCS Application Protocol (LCS-AP) between the Mobile Management Entity (MME) and Evolved Serving Mobile Location Centre (E-SMLC); SLs interface", available at http://www.3gpp.org, incorporated herein by reference. The MME sends a PROVIDE SUBSCRIBER LOCATION RESPONSE message to the GMLC, see 3GPP TS 25.172 "Evolved Packet Core (EPC) LCS Protocol (ELP) between the Gateway Mobile Location Centre (GMLC) and the Mobile Management Entity (MME); SLg interface", available at http://www.3gpp.org, incorporated herein by reference.

5.0 Reporting Formats

Position information in any of several reporting formats can be included in an information element in an appropriate message. Example, non-exhaustive reporting formats are listed below. For UMTS the last five of the following reporting formats can be included in the MEASUREMENT REPORT message and the LOCATION REPORT message. For UMTS the fifth and seventh reporting formats can be included in the MEASUREMENT REPORT message and the LOCATION REPORT message for the A-GPS method, and are respectively associated with two dimensional and three dimensional reporting. For LTE the last five of the following reporting formats can be included in the PROVIDE LOCATION INFORMATION message, the LOCATION RESPONSE and the PROVIDE LOCATION INFORMATION message. The fifth and seventh reporting formats can be included in the PROVIDE LOCATION INFORMATION message, the LOCATION RESPONSE and the PROVIDE LOCATION INFORMATION message for the A-GPS method, and are respectively associated with two dimensional and three dimensional reporting.

5.1 Polygon

The polygon format is described by a list of 3-15 latitude, longitude corners, encoded in WGS 84 co-ordinates. See, e.g., 3GPP, TS 23.032, "Universal Geographical Area Description (GAD)," available at http://www.3gpp.org. The polygon format does not carry confidence information. This format may be obtained by application of cell ID positioning and AECID positioning in LTE.

5.2 Ellipsoid Arc

The ellipsoid arc is described by a center point (eNodeB antenna position), encoded as latitude, longitude in WGS 84 co-ordinates. Furthermore, the format contains an inner radius of the arc, a thickness of the arc as well as the offset angle (clockwise from north) and the included angle (opening angle). Together, these parameters define a circular sector, with a thickness and with left and right angles. See, e.g., 3GPP, TS 23.032, "Universal Geographical Area Description (GAD)," available at http://www.3gpp.org, incorporated herein by reference. The ellipsoid arc does carry confidence information. This format is produced, e.g., by cell ID+TA positioning in LTE.

5.3 Ellipsoid Point

The ellipsoid point format is described by a center point, encoded as latitude, longitude in WGS 84 co-ordinates. The format neither carries uncertainty, nor confidence information.

5.4 Ellipsoid Point with Uncertainty Circle

The ellipsoid point with uncertainty circle format consists of a center point, encoded as latitude, longitude in WGS 84 co-ordinates, in combination with a radial uncertainty radius, encoded as in 3GPP, TS 23.032, "Universal Geographical Area Description (GAD)," available at http://www.3gpp.org. The format does not carry confidence information. This is addressed by particular embodiments of the present invention.

5.5 Ellipsoid Point with Uncertainty Ellipse (Confidence Included)

The ellipsoid point with uncertainty ellipse format consists of a center point, encoded as latitude, longitude in WGS 84 co-ordinates. The uncertainty ellipse is encoded as a semi-major axis, a semi-minor axis and an angle relative to north, counted clockwise from the semi-major axis, see 3GPP, TS 23.032, "Universal Geographical Area Description (GAD)," available at http://www.3gpp.org, incorporated herein by reference. The format carries confidence information. This format is typically produced by OTDOA and A-GPS positioning in LTE.

5.6 Ellipsoid Point with Altitude

The ellipsoid point with altitude format is encoded as an ellipsoid point, together with an encoded altitude, see 3GPP, TS 23.032, "Universal Geographical Area Description (GAD)," available at http://www.3gpp.org, incorporated herein by reference. The format neither carries uncertainty, nor confidence information.

5.7 Ellipsoid Point with Altitude and Uncertainty Ellipsoid (Confidence Included)

The ellipsoid point with altitude and uncertainty ellipsoid (confidence included) format is the format commonly received from A-GPS capable terminals. It consists of an ellipsoid point with altitude and an uncertainty ellipsoid, the latter encoded with a semi-major axis, a semi-minor axis, an angle relative to north, counted clockwise from the semi-major axis, together with an uncertainty altitude, see 3GPP, TS 23.032, "Universal Geographical Area Description (GAD)," available at http://www.3gpp.org, incorporated herein by reference. The format carries confidence information. This format is typically produced by A-GPS positioning in LTE.

6.0 Rescaling

Examples of the calculations in the user equipment unit (UE) that may be used to determine the position and the corresponding inaccuracy for the UE-based A-GPS and the UE-based OTDOA methods can be found in, e.g., E. D. Kaplan, *Understanding GPS—Principles and Applications*, Norwood, Mass.: Artech House, 1996, incorporated herein by reference. For present purposes it is sufficient to note that the user equipment unit (UE) measures the time of arrival of signals transmitted from multiple GPS satellites, or eNodeBs. The orbits and positions of these satellites are available with very high precision since this information is transmitted to the terminal as assistance data in A-GPS positioning Such assistance data can comprise, e.g., trajectory models that describe the orbits of the satellites.

The pseudoranges measured with respect to the satellites can then be combined to compute the position of the terminal By doing a linearization of the nonlinear measurement geometry and treating the time measurement errors as randomly identically distributed, a covariance matrix describing the uncertainty can be calculated. The covariance matrix is the second moment of the almost Gaussian uncertainty (follows by the strong law of large numbers). This covariance matrix represents an ellipse in the two dimensional (2D) horizontal case and an ellipsoid in the three dimensional (3D) case.

In particular embodiments, the aforementioned covariance matrices are associated with confidence values of 39% (2-dimensional case) and 20% (3-dimensional case), respectively. However, the report from the user equipment unit (UE) to network node (either the evolved Serving Mobile Location Center (eSMLC) for the LTE radio access network (RAN) or to the radio network controller (RNC) for the WCDMA radio access network (RAN)) may use any of the last five formats listed in section 5.0 above. Of those reporting formats, neither the ellipsoid point, the ellipsoid point with uncertainty circle, nor the ellipsoid point with altitude carry confidence information. Hence, it cannot be guaranteed that a confidence value is available in the network node (e.g., eSMLC or RNC) for re-scaling or shape conversion of the obtained result.

When the measured position and uncertainty are received in a network node (such as the RNC in a WCDMA network and the evolved Serving Mobile Location Center (eSMLC) node in a LTE network) the network node may attempt to perform a shape conversion. In particular, the network node may attempt to scale the received uncertainty so that the confidence value of the scaled uncertainty becomes equal to the confidence value that is configured for reporting to the core network for the specific service valid for the ongoing positioning. See, e.g., A. Kangas and T. Wigren, "Transformation of Positioning reporting formats", International Patent Application, PCT/SE2007/050237/Apr. 11, 2007, which is incorporated herein by reference. This scaling attempt thus requires knowledge of the confidence of the transformed reporting format. But significantly, as indicated above, for some reporting formats the confidence parameter is not reported/provided.

Thus, with the existing state of technology various reporting formats (particularly including the polygon reporting format and the ellipsoid point with uncertainty circle reporting format) lack information elements that carry confidence information. The polygon reporting format is pertinent to the AECID positioning method. Unfortunately the polygon format presently specified by 3GPP does not carry confidence information, thus reducing the flexibility of the reporting to the end user (polygon computation is normally performed in the AECID positioning node).

A reporting format that does not include confidence information does not carry enough information to allow a correct scaling of the uncertainty of the reported result. The scaling is performed in a node such as the radio network controller (RNC) in WCDMA and the evolved Serving Mobile Location Center (eSMLC) node in Long Term Evolution (LTE). Without confidence information to allow correct scaling there is a significant danger that the quality of service (QoS) of the requested position is erroneously classified as not being satisfied. This may then affect reported results from the node (e.g., RNC or eSMLC) as well as the stepping of internal counters. These counters, whose values may be adversely affected by the lack of confidence information and incorrect scaling, are important since the counters provide statistics on regulatory E-911 positioning performance to regulatory agencies such as the United States Federal Communications Commission.

The consequence of not having confidence information is that positioning results for the A-GPS, OTDOA, cell ID and AECID positioning methods may not be properly reported. More precisely the reported accuracy may not be scaled according to the measured and requested confidence values. Furthermore, the confidence of the reported positioning result cannot be reported to the end user for the AECID method, and may not be reported to the end user for the A-GPS and OTDOA positioning methods.

Another problem with prior art technology is that sometimes the terminal (e.g., user equipment unit (UE)) may determine an A-GPS position and uncertainty that exactly matches the requested horizontal and vertical accuracy that is received from the RNC. Normally the user equipment unit (UE) then responds with a confidence value of 39% or 20% in the 2D and 3D cases, respectively. Most often the configured confidence to be reported to the end user from the RNC or eSMLC is significantly higher, in emergency positioning typically 95%. In such case the RNC or eSMLC typically scales up the uncertainty region obtained from the wireless terminal to comply with the higher confidence value. The result is then an uncertainty region that is higher than what was originally requested by the end user, this resulting in a failure to meet the requested quality of service (QoS). This is then recorded in statistics, and also signaled to the end user, resulting in increased customer complaints.

SUMMARY

In one of its aspects the technology disclosed herein concerns method and apparatus for generating/transmitting/processing a position reporting message of a type which expresses position of a wireless terminal in either (1) a polygon report format, or (2) an ellipsoid point with uncertainty circle format. In such aspect the technology disclosed herein particularly concerns, e.g., inclusion of a confidence parameter (e.g., as an information element of the position reporting message) in addition to a reported position parameter and reported uncertainty parameter.

In another of its aspects the technology disclosed herein concerns a communications device which receives a position request message configured to request determination of a position of a wireless terminal. The position request message includes a position uncertainty criteria. The device is configured to know that a confidence differential exists between a confidence reporting characteristic of the wireless terminal and confidence criteria known to the communications device. As a result of the confidence differential, the device is configured to scale the position uncertainty criteria to obtain a scaled position uncertainty criteria for use by the wireless terminal.

In differing embodiments, the confidence criteria is known to the communications device either by being included in the position request message or (as in the case of WCDMA) by being configured in the communications device.

In an example embodiment and implementation, the communications device is configured to scale the position uncertainty criteria in accordance with the confidence differential to obtain the scaled position uncertainty criteria.

In an example embodiment, the device is configured to transmit the scaled position uncertainty criteria to the wireless terminal, and is further configured to receive back from the wireless terminal information comprising a reported position uncertainty parameter and a reported confidence parameter. The device is further configured to re-scale the reported position uncertainty parameter in a manner so that the position uncertainty criteria is satisfied. The reported position uncertainty parameter is based on the scaled position uncertainty criteria and the reported confidence parameter is based on the confidence reporting characteristic of the wireless terminal. As an example, the device can be configured to re-scale the reported position uncertainty parameter in accordance with the confidence differential. In an example implementation suitable for a WCDMA radio access network (RAN), the device comprises a radio network controller (RNC) node. In another example implementation suitable for use with a Long Term Evolution (LTE) radio access network (RAN), the device comprises an evolved Serving Mobile Location Center (eSMLC) node.

In another example embodiment the communications device is the wireless terminal itself. The wireless terminal is configured to use the scaled position uncertainty criteria to determine a position parameter, a position uncertainty parameter, and a confidence parameter. The scaled position uncertainty criteria is used as an input for the A-GPS position determination since, e.g., the terminal will try and meet the scaled position uncertainty criteria (it may, e.g., continue longer if this criterion is more difficult to meet). The position uncertainty parameter which is output from the A-GPS determination can be but need not necessarily be the same as the scaled position uncertainty criteria (e.g., it may be less than or equal or larger.) The wireless terminal is further configured to re-scale the reported position uncertainty parameter to form a re-scaled uncertainty parameter that satisfies the position uncertainty criteria, and to generate a position report comprising the position parameter, the re-scaled uncertainty parameter, and the confidence parameter.

In an example implementation, the wireless terminal is configured to generate the position report wherein the position parameter is expressed in a polygon report format, and wherein the polygon report format includes an information element comprising the reported confidence parameter. In another example implementation, the wireless terminal is configured to generate the position report wherein the position parameter is expressed in an ellipsoid point with uncertainty circle report format, and wherein the ellipsoid point with uncertainty circle report format includes an information element comprising the reported confidence parameter.

In an example embodiment the device comprises a computer-implemented scaler configured to scale the position uncertainty criteria to obtain the scaled position uncertainty criteria for use by the wireless terminal.

In yet another of its aspects the technology disclosed herein comprises a method of operating a communications device. An act of the general method comprises receiving at a network device a position request message configured to request determination of a position of a wireless terminal. The position request message includes position uncertainty criteria. Another act of the general method comprises the device determining that a confidence differential exists between a confidence reporting characteristic of the wireless terminal and confidence criteria known to the communications device. As a result of the confidence differential, another act of the general method comprises the device scaling the position uncertainty criteria to obtain scaled position uncertainty criteria for use by the wireless terminal.

In differing embodiments, the confidence criteria is known to the communications device either by being included in the position request message or (as in the case of WCDMA) by being configured in the communications device.

In an example embodiment and mode the method further comprises scaling the position uncertainty criteria in accordance with the confidence differential to obtain the scaled position uncertainty criteria.

In an example embodiment and mode the method of further comprises: transmitting the scaled position uncertainty criteria to the wireless terminal; receiving from the wireless terminal information comprising a reported position uncertainty parameter and a reported confidence parameter, the reported position uncertainty parameter being based on the scaled position uncertainty criteria and the reported confidence parameter being based on the confidence reporting characteristic of the wireless terminal; and re-scaling the reported position uncertainty parameter in a manner so that the position uncertainty criteria is satisfied. The reported position uncertainty parameter is based on the scaled position uncertainty criteria and the reported confidence parameter is based on the confidence reporting characteristic of the wireless terminal. For example, in an example implementation the method further comprises re-scaling the reported position uncertainty parameter in accordance with the confidence differential. In one example implementation the method further comprises performing the scaling at a radio network controller (RNC) node. In another example implementation the method further comprises performing the scaling at an evolved Serving Mobile Location Center (eSMLC) node.

Another example embodiment and mode comprises performing the scaling at a wireless terminal and using the scaled position uncertainty criteria to determine a position parameter, position uncertainty parameter, and a confidence parameter. The wireless terminal is configured to use the scaled position uncertainty criteria to determine a position parameter, a position uncertainty parameter, and a confidence parameter. The scaled position uncertainty criteria is used the input for the A-GPS position determination since, e.g., the terminal will try and meet the scaled uncertainty criteria (it may, e.g., continue longer if this criterion is more difficult to meet). The position uncertainty parameter which is output from the A-GPS determination can be but need not necessarily be the same as the scaled position uncertainty criteria (e.g., it may be less than or equal or larger.) The wireless terminal is further configured to re-scale the reported position uncertainty parameter to form a re-scaled uncertainty parameter that satisfies the position uncertainty criteria, and to generate a position report comprising the position parameter, the re-scaled uncertainty parameter, and the confidence parameter.

In an example implementation the method further comprises, in the position report, expressing the position parameter in a polygon report format; and, including in the polygon report format an information element comprising the reported confidence parameter. In another example implementation the method further comprises, in the position report, expressing the position parameter in an ellipsoid point with uncertainty circle report format; and, including in the ellipsoid point with uncertainty circle report format an information element comprising the reported confidence parameter. Inclusion of the reported confidence parameter(s) in the "position report" encompasses and includes inclusion of the confidence parameters in reports that are provided from the eSMLC to the end user.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 6 is a diagrammatic view of an example A-GPS positioning system wherein acquisition assistance data includes confidence information.

FIG. 7A is a diagrammatic view of a "polygon" reporting format according to an aspect of the technology disclosed herein.

FIG. 7B is a diagrammatic view of an "ellipsoid point with uncertainty circle" reporting format according to an aspect of the technology disclosed herein.

FIG. 7C illustrates a message including acquisition assistance data as comprising initial location estimate.

DETAILED DESCRIPTION

Figure 1:
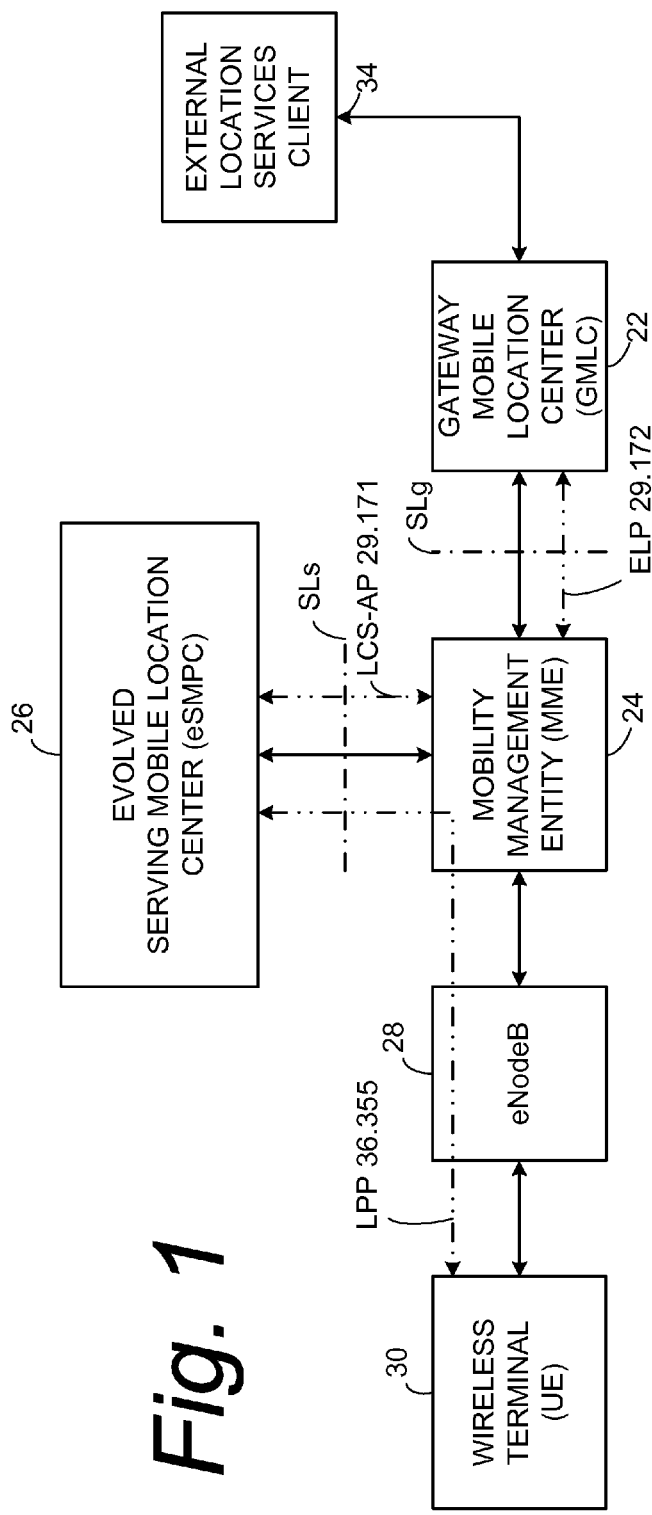
FIG. 1 is a schematic view of portions of a telecommunications system including portions of a Long Term Evolution (LTE) radio access network (RAN) useful for position location determination.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

7.0 Signaling of Confidence Information: Overview

In one of its aspects the technology disclosed herein involves inclusion of confidence information, e.g., probability information, in various messages and communications which heretofore omitted the confidence information. For example, this aspect of the technology disclosed herein encompasses:
Addition of a confidence information element to the 3GPP polygon format: (1) over the relevant interfaces in the Long Term Evolution (LTE) radio access network (RAN) between the evolved Serving Mobile Location Center (eSMLC) and the end users; and (2) over the relevant interfaces in the WCDMA radio access network (RAN) between the radio network controller (RNC) and the end user.
Addition of a confidence information element to the 3GPP ellipsoid point with uncertainty circle format:
over the measurement context of the wireless terminal and the eSMLC;
over the position reporting context between the eSMLC and the end user;
over the relevant interfaces in the WCDMA radio access network (RAN) between the measurement context of the wireless terminal and the RNC;
over the position reporting context between the RNC and the end user. In both cases the end user could be another application running in the wireless terminal.
Addition of a confidence information element to acquisition assistance data carried over interfaces in the WCDMA radio access network (RAN) or in the Long Term Evolution (LTE) radio access network (RAN).

7.1 Signaling of Confidence Information: Example Embodiments

FIG. 1 shows portions of a telecommunications system including portions of a Long Term Evolution (LTE) radio access network (RAN) useful for position location determination. The architecture illustrated in FIG. 1 includes Gateway Mobile Location Center (GMLC) 22; Mobility Management Entity (MME) 24; evolved Serving Mobile Location Center (eSMLC) 26; base station or eNodeB 28; and wireless terminal (UE) 30. The Gateway Mobile Location Center (GMLC) 22 is the first node an external Location Services client 34 accesses in a public land mobile network (PLMN). The mobility management entity (MME) is a network node which keeps the information in the UE context and handles, e.g., Tracking Area Update (TAU) as described in 3GPP TS 23.401. Mobility Management Entity (MME) 24 communicates with Gateway Mobile Location Center (GMLC) 22 over an interface known as the SLg interface (defined in ELP 29.172) and with evolved Serving Mobile Location Center (eSMLC) 26 over an interface known as the SLs interface (defined in LCS-AP 29.171). The SLs and SLg interfaces are represented by dashed-dotted lines in FIG. 1.

FIG. 1 further illustrates employment of certain protocols by dashed-double dotted lines, such as employment of the LTE Positioning Protocol (LPP) between evolved Serving Mobile Location Center (eSMLC) 26 and wireless terminal (UE) 30; employment of the LCS-AP 29.171 protocol between Mobility Management Entity (MME) 24 and evolved Serving Mobile Location Center (eSMLC) 26; and employment of the EPC 29.172 protocol between Mobility Management Entity (MME) 24 and Gateway Mobile Location Center (GMLC) 22. The LPP protocol is described, e.g., in LPP specification 3GPP IS 36.335, "LTE Positioning Protocol (LPP)", available at http://www.3gpp.org, incorporated herein by reference. The LCS-AP 29.171 protocol is described, e.g., in 3GPP TS 29.171: "LCS Application Protocol (LCS-AP) between the MME and E-SMLC", available at http://www.3gpp.org, incorporated herein by reference. The EPC protocol is described, e.g., in 3GPP TS 29.172, "Location Services (LCS); EPC LCS Protocol (ELP) between the GMLC and the MME; SLg interface", available at http://www.3gpp.org.

The technology disclosed herein is not limited to a Long Term Evolution (LTE) network although such is shown in FIG. 1. It should also be understood that in a WCDMA radio access network (RAN) the functions of the evolved Serving Mobile Location Center (eSMLC) node can be preformed by a radio network controller (RNC) node which connects through a radio base station node to the wireless terminal.

As used herein, "wireless terminal(s)" or "UE" can be mobile stations or user equipment units (UE) such as but not limited to mobile telephones ("cellular" telephones) and laptops with wireless capability, e.g., mobile termination, and thus can be, for example, portable, pocket, hand-held, computer-included, or car-mounted mobile devices which communicate voice and/or data with radio access network.

7.2 Signaling of Confidence Information: Example Methods

Figure 2:
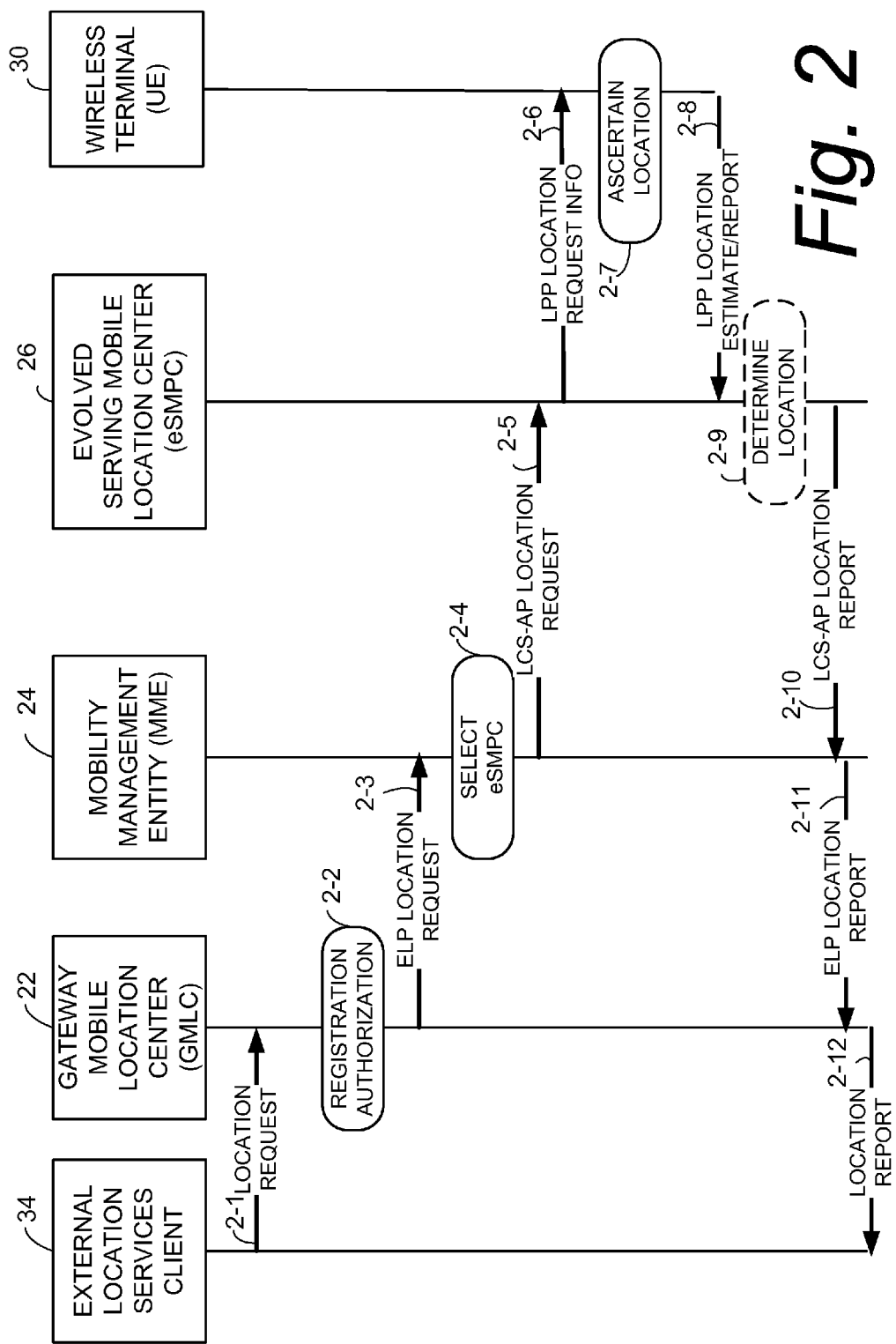
FIG. 2 is a diagrammatic view of message flow in the telecommunications system of FIG. 1 for a mobile terminating location request.

FIG. 2 shows message flow in the telecommunications system of FIG. 1 for a mobile terminating location request. The message flow of FIG. 2 is illustrated in the form of various acts or steps. Act 2-1 depicts external Location Services client 34 making a mobile termination location request to Gateway Mobile Location Center (GMLC) 22. The purpose of the mobile termination location request is to ascertain the location position of wireless terminal (UE) 30.

After performing a registration authorization (depicted by act 2-2), as act 2-3 Gateway Mobile Location Center (GMLC) 22 sends the location request (ELP Provide Subscriber Location Request) to Mobility Management Entity (MME) 24. As act 2-4 Mobility Management Entity (MME) 24 selects an available eSMLC to serve the location request for a wireless terminal. Further, as act 2-5, Mobility Management Entity (MME) 24 forwards the location request on the SLs interface using the LCS-AP protocol as specified in 3GPP TS 29.171 (e.g., LCS-AP Location Request). As act 2-6 the chosen eSMLC (e.g., evolved Serving Mobile Location Center (eSMLC) 26 in FIG. 1 sends the location request to the wireless terminal (UE) 30 using the LPP protocol as specified in 3GPP TS 36.355 (e.g., LPP Request Location Information). Note that the LPP messages are tunneled through the Mobility Management Entity (MME) 24 and the base station or eNodeB 28.

As act 2-7 the wireless terminal ascertains its position information for reporting its position back to evolved Serving Mobile Location Center (eSMLC) 26. As indicated previously, the location position information includes the position location parameters, including its position parameter, its uncertainty parameter, and its confidence/probability parameter.

As act 2-8 measurements from the wireless terminal (UE) 30 or a location estimate is actually sent back to evolved Serving Mobile Location Center (eSMLC) 26 using the LTE Positioning Protocol (LPP) (e.g., LPP Provide Location Information). If the location was not estimated by wireless terminal (UE) 30, as indicated by optional act 2-9 evolved Serving Mobile Location Center (eSMLC) 26 determines the location of wireless terminal (UE) 30. However determined, as act 2-10 the location report (e.g., LCS-AP Location Response) is sent to Mobility Management Entity (MME) 24. As act 2-11 Mobility Management Entity (MME) 24 in turn forwards the location report (ELP Provide Subscriber Location Response) to Gateway Mobile Location Center (GMLC) 22. The Gateway Mobile Location Center (GMLC) 22 receives final location estimates from Mobility Management Entity (MME) 24 on the SLg interface using the ELP protocol as specified in 3GPP TS 29.172. As act 2-12 Gateway Mobile Location Center (GMLC) 22 forwards the location to external Location Services client 34.

Although not specifically shown in FIG. 2, it will be appreciated that a node such as the evolved Serving Mobile Location Center (eSMLC) node or the radio network controller (RNC) can subsequently perform a re-scaling operation regarding uncertainty parameters. The rescaling of uncertainty parameters is described in more detail hereinafter.

Figure 3:
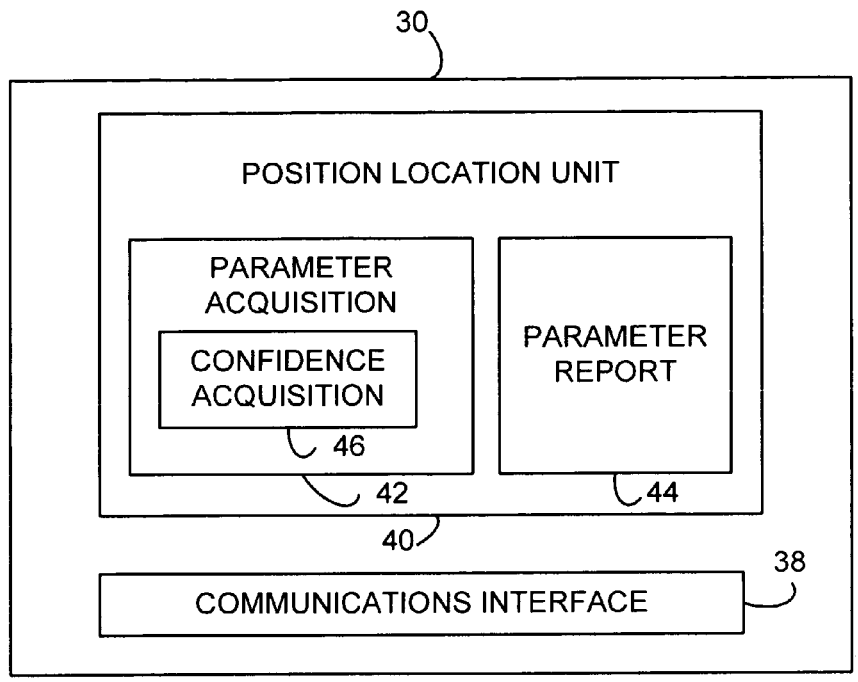
FIG. 3 is a schematic simplified view of a wireless terminal according to an example embodiment.

7.3 Signaling of Confidence Information: Example Wireless Terminal Embodiments FIG. 3 illustrates an example wireless terminal 30 according to a non-limiting basic example embodiment. FIG. 3 shows wireless terminal (UE) 30 as comprising, among its other functionalities and units, communications interface 38 and position location unit 40. The position location unit 40 is shown as further comprising both parameter acquisition unit 42 and parameter reporting unit 44. Among its various constituent units and functionalities, parameter acquisition unit 42 comprises confidence acquisition unit 46 which serves, e.g., for performing act 2-7. Act 2-7 comprises acquiring or determining the aforementioned confidence or probability parameter. The confidence acquisition unit 46 of wireless terminal (UE) 30 determines a value for the confidence parameter using knowledge of how the uncertainty is computed, e.g., if a 2D or 3D report is used. This confidence parameter may represent any appropriate value identifying, indicating, or otherwise describing the estimated probability that wireless terminal UE (30) is located within an area associated with the confidence parameter. The confidence parameter determined or ascertained by confidence acquisition unit 46 is included, along with the position parameter and the uncertainty parameter, in the position location report generated by parameter reporting unit 44. The position location report generated by parameter reporting unit 44 is sent as the message of act 2-8 of FIG. 2.

Figure 4:
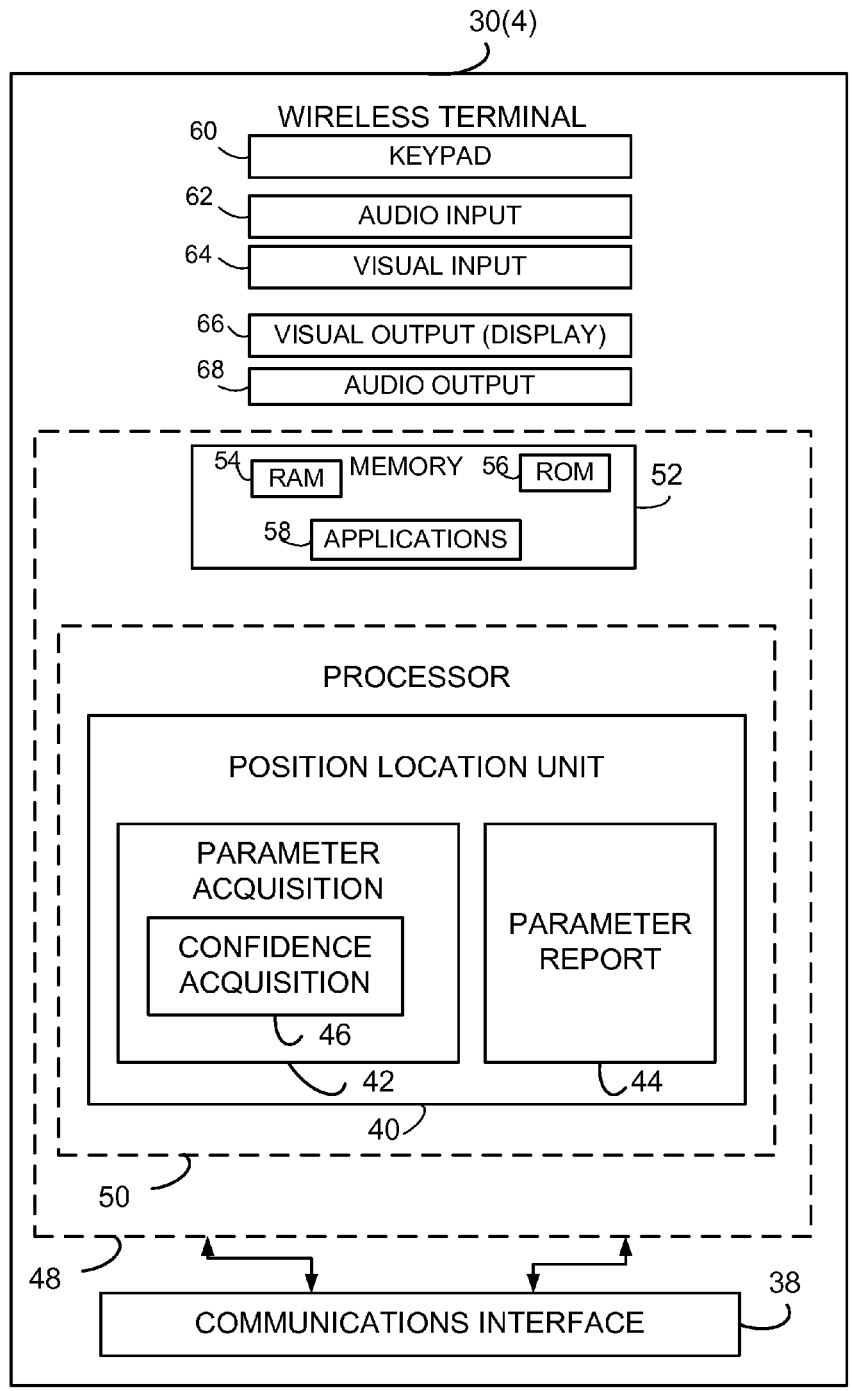
FIG. 4 is a schematic view of a wireless terminal according to a machine-implemented example embodiment.

7.4 Signaling of Confidence Information: Example Machine Platform Embodiments FIG. 4 illustrates more structural detail for certain example embodiments of wireless terminal (UE) 30. For example FIG. 4 illustrates that position location unit 40 can be provided on or realized by a machine platform 48.

The machine platform 48 can take any of several forms, such as (for example) a computer implementation platform or a hardware circuit platform. FIG. 4 particularly shows machine platform 48 as being a computer platform wherein logic and functionalities of position location unit 40 are implemented by one or more computer processors or controllers 50 as those terms are herein expansively defined.

The terminology "platform" is a way of describing how the functional units of mobile station 30 can be implemented or realized by machine. One example platform 48 is a computer implementation wherein one or more of the elements framed by the broken line, including position location unit 40, are realized by one or more computer processors or controllers 50 as those terms are herein expansively defined. The processor(s) 50 execute coded instructions in order and generate non-transitory signals to perform the various acts described herein. In such a computer implementation the mobile station 30 can comprise, in addition to a processor(s), memory section 52 (which in turn can comprise random access memory 54; read only memory 56; and application memory 58 (which stores, e.g., coded instructions which can be executed by the processor to perform acts described herein); and any other memory such as cache memory, for example).

In conjunction with the computer platform FIG. 4 shows wireless terminal (UE) 30 as including various interfaces, among which are keypad 60; audio input device (e.g. microphone) 62; visual input device (e.g., camera) 64; visual output device (e.g., display 66); and audio output device (e.g., speaker) 68. Other types of input/output devices can also be connected to or comprise wireless terminal (UE) 30.

Another example platform suitable for wireless terminal (UE) 30 is that of a hardware circuit, e.g., an application specific integrated circuit (ASIC) wherein circuit elements are structured and operated to perform the various acts described herein.

7.5 Signaling of Confidence Information in Difference Type Messages

It will be appreciated that the message flow of FIG. 2 is for a procedure called Mobile Terminated Location Request. Other procedures like Mobile Originated Location Request and Network Induced Location Request are also defined in the LCS standards. Messages of those other procedures can also include the confidence information, and the confidence information (e.g., in the form of a confidence information element) can be carried in messages as needed over other interfaces such as the LPP interface, the SLp interface, and the SLs interface.

7.6 Signaling of Confidence Information with Acquisition Assistance Data

As explained above, acquisition assistance data provides the wireless terminal with information that allows the wireless terminal to detect the GPS signals more quickly and allows detection of much weaker signals. It does this by providing information to the wireless terminal as to where to look for the signals. Typically, A-GPS accuracy can become as good as 10 meters without differential operation.

Figure 5:
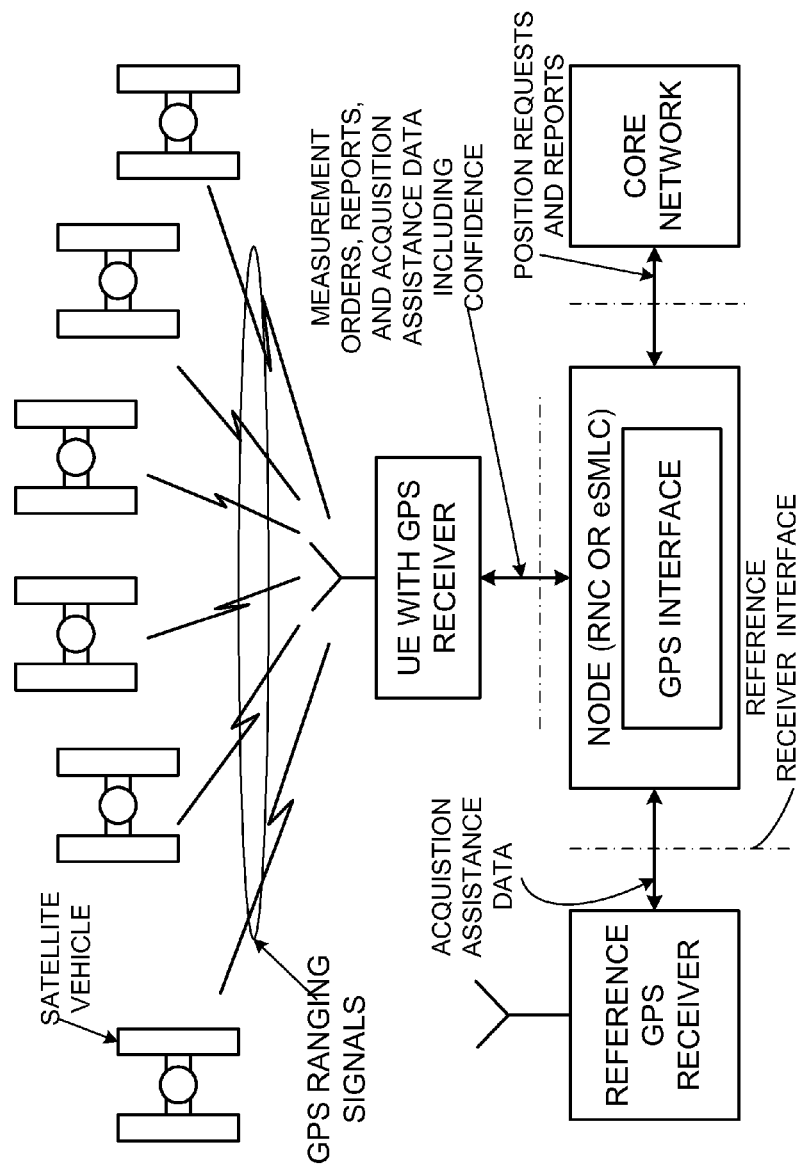
FIG. 5 is a diagrammatic view of an example SMLC network wherein the SMLC receives a request for assistance data for a particular wireless terminal and wherein the data includes confidence information.

An example of an A-GPS positioning system is displayed in FIG. 5. As shown in FIG. 5, GPS reference receivers attached to a cellular communication system collect assistance data that, when transmitted to GPS receivers in terminals connected to the cellular communication system, enhance the performance of the GPS terminal receivers. FIG. 6 shows an example serving mobile location center (SMLC) network wherein the SMLC receives a request for assistance data for a particular wireless terminal (UE). The request effectively includes the initial location estimate and the uncertainty of the estimate, which is based on the size of the serving cell. The initial location estimate and the uncertainty are used to calculate the acquisition assistance data using information from a wide area reference network (WARN). This acquisition assistance data is used to populate the message that is sent back to the network and on to the wireless terminal.

FIG. 5 and FIG. 6 further show that, according to an aspect of the technology disclosed herein, a message including acquisition assistance data comprises not only the initial location estimate and the uncertainty of the estimate, but also a confidence or probability value for the estimate.

7.7 Signaling of Confidence Information in Information Elements

According to one aspect of the technology disclosed herein, various messages include additional information element(s) that specify the aforementioned confidence parameter. Such messages include not only those in the flow of FIG. 2, but also messages that pertain to acquisition assistance data.

For example, unlike prior art practice, confidence information elements are added to the 3GPP "polygon" and "ellipsoid point with uncertainty circle" reporting formats that are used on the LPP interface, the SLp interface, and the SLs interface. To reflect these aspects of the technology disclosed herein, FIG. 7A illustrates the "polygon" reporting format as comprising the following information elements (among other possible information elements): position information element 70 and confidence information element 74. By the size of the polygon the position information element 70 implicitly provides the uncertainty information, so that a separate information element is not needed.

Similarly, FIG. 7B illustrates the "ellipsoid point with uncertainty circle" reporting format as comprising the following information elements (among other possible information elements): position information element 80; uncertainty information element 82; and confidence information element 84.

FIG. 7C illustrates a message including acquisition assistance data as comprising initial location estimate 90; the uncertainty of the estimate 92; and confidence or probability value 94 for the estimate.

Table 1 appended hereto reflects (by boldface or dark font) changes that can be implemented to the LPP specification 3GPP TS 36.335 (incorporated herein by reference) in order to add information elements reflected by confidence information element 44 and confidence information element 54.

Table 2 appended hereto reflects (by boldface or dark font) changes that can be implemented to Table 7.4.12-1 in 3GPP TS 29.171 in order to implement the technology disclosed herein over the SLp and SLs interfaces. In addition, the 3GPP TS 23.032 specification also needs the corresponding modifications of Table 2.

The aspect of the technology disclosed herein that involves adding the confidence information (e.g., confidence information element) to the reported information affords many advantages. Example advantages include the following:

Signaling means that guarantee that confidence can always be reported from the UE to the eSMLC, for UE based A-GPS positioning in the LTE system.

Signaling means that guarantee that confidence can always be reported from the UE to the eSMLC, for UE based OTDOA positioning in the LTE system.

Enabling of confidence scaling in the eSMLC of reported positioning results from the UE, to comply with end user confidence requirements, also for the shape ellipsoid point with uncertainty circle.

Signaling means for reporting of confidence from the eSMLC to the end user for UE based A-GPS and UE-based OTDOA positioning, using the ellipsoid point with uncertainty circle format.

Signaling means for reporting of confidence from the end user for the cell ID and AECID positioning methods.

8.0 Parameter Scaling

8.1 Reasons for Parameter Scaling

Another aspect of the technology disclosed herein addresses, e.g., conventional problems caused by too vague requirements and signaling of what "positioning accuracy" means. As mentioned above, accuracy in the radio navigation field, in particular for A-GPS, is a random quantity. This means that any time a position uncertainty is determined, the uncertainty should be accompanied with a corresponding "probability" (or "confidence") that the terminal is actually in the region defined by the reported position and the reported uncertainty. In the 3GPP WCDMA specification uncertainty can be expressed in terms of an uncertainty circle, an uncertainty ellipse and an uncertainty ellipsoid. See, e.g., 3GPP, TS 23.032, "Universal Geographical Area Description (GAD)", available at http://www.3gpp.org.

A problem affecting A-GPS addressed by this aspect of the technology disclosed herein originates from the following facts:

Fact 1. The 3GPP standard does not specify exactly how the uncertainty and the probability (also known as the confidence) are related. Typically this would require a specification stating how the confidence value shall be related to the covariance matrix of the uncertainty measure. In particular, this would require a different handling of 2-dimensional and 3-dimensional uncertainty.

Fact 2: Uncertainty criteria, such as requested horizontal and vertical accuracies, that is received in a node (such as the RAN or eSMLC) from the core network (and thus from the end user) do not specify the confidence for which the quality of service (QoS) request is valid.

Fact 3: The uncertainty criteria (horizontal and vertical accuracies) that is transmitted from a node (such as the RNC or the eSMLC) to the terminal to specify the requested accuracy of the measured A-GPS result are not accompanied by a confidence value.

Fact 4: The A-GPS result reported from the terminal to a node (such as the RNC or eSMLC) normally contains an uncertainty parameter (e.g. in the form of at least horizontal accuracy and most often also a vertical accuracy) and a corresponding confidence value.

Fact 5: Shape conversions are applied in the RNC of the WCDMA RAN or in the eSMLC of the LTE RAN in order, e.g., to scale the accuracies according to operator configured confidence values for reporting of positioning results.

As understood from the foregoing, when a node (such as the RNC of the WCDMA RAN or the eSMLC of the LTE RAN) provides the wireless terminal with requested accuracy information, the node neither knows nor can signal a correct confidence value to the terminal. As a consequence the action in systems known in prior art has been to forward the incoming uncertainty criteria (in the form of horizontal and vertical accuracy requirements) to the wireless terminal unaffected. Then the wireless terminal tries to provide a result according to the request. However, the result provided by the wireless terminal is provided at the confidence level selected by the specific wireless terminal type, not necessarily at the confidence level really needed by the end user. Therefore, the node (e.g., RNC of the WCDMA RAN or eSLMC of the LTE RAN) may perform a shape conversion to scale the obtained uncertainty parameter (e.g., the horizontal and vertical accuracies) to the level that is configured for the specific service (e.g. as directed by the Client Type IE).

As an example of the foregoing, it may then happen that the wireless terminal provides a result, exactly at the received requested accuracy level, with the accuracy requested, and at a confidence level of typically 39% or 20% (2D and 3D covariance matrix level, respectively). However, in case of North American emergency positioning 95% confidence is required for reporting. Hence in this case the node (RNC or eSMLC) would scale up the obtained uncertainty parameter (e.g., horizontal and vertical accuracies). Such scaling up would result in a failure to meet the requested accuracies that were originally received from the core network and the end user. The fact that the QoS was not fulfilled may also be signaled to the end user, and it may also affect performance management counters. Both of these result in statistics that may in the end be reported to the US Federal Communication Commission (FCC) with the result that the operator's fulfillment of the regulatory E-911 requirements may be in question.

8.2 Overview of Parameter Scaling

In view of the foregoing, an aspect of the technology disclosed herein therefore concerns a scaling technique and algorithm that scales the uncertainty criteria originally received from the end user before the uncertainty criteria is sent on to the wireless terminal as requirements on the accuracy of A-GPS positioning performed by/for the wireless terminal. In an example embodiment the amount/degree of scaling is selected according to a configured best estimate of the confidence and uncertainty relation, and such best estimate can be based on the majority of the terminals of the network. The scaling also accounts for the type of service, e.g., as signaled by the Client Type IE in the WCDMA RANAP LOCATION REPORTING CONTROL message.

The technology disclosed herein thus performs and features a new scaling of position uncertainty criteria that is received from the end user. Position uncertainty criteria may represent any appropriate information indicating an accuracy, precision, certainty, or uncertainty that is desired, required, or expected by the requesting component, such as horizontal and vertical inaccuracies requested by the end user. Position uncertainty criteria may represent or indicate a specific value, a range of values, a maximum or minimum threshold, a category (e.g., "high accuracy"), or other information describing the relevant accuracy, precision, certainty, or uncertainty.

For a WCDMA RAN, for example, the position uncertainty criteria can be received over the RANAP interface between the RNC and the core network. For a WCDMA RAN case the scaling can be performed in the RNC; for an LTE RAN case the scaling can be performed in the evolved Serving Mobile Location Center (eSMLC) node. In another case the scaling can alternatively be performed in the wireless terminal itself. In all such cases the scaling transforms the requested inaccuracies (e.g., the position uncertainty criteria) in accordance with (e.g., to be consistent with) the confidence values that are reported by the terminals (or configured best estimates of those confidence values). The wireless terminal's confidence values can be, e.g. 39% in a two dimensional (2D) case and 20% in a three dimensional (3D) case. For example, for emergency positioning this would mean that the horizontal and vertical inaccuracy would be scaled down. The wireless terminal would then determine the A-GPS position (position parameter), uncertainty parameter, and confidence parameter. A shape conversion is then performed to re-scale up the reported uncertainty to correspond to the confidence value needed for reporting. In some cases the parameters are sent to a node (e.g., the RNC or the eSMLC) and the node performs the shape conversion. In other cases the wireless terminal itself can perform the shape conversion/re-scaling. In view of the scaling and subsequent re-scaling of the technology disclosed herein the quality of service can be met.

Advantages of this aspect of technology disclosed herein include an enhanced accuracy as well as a reduced risk for the requested QoS not being fulfilled.

8.3 Example Embodiments 8.3.1 Generic Embodiments

Figure 8:
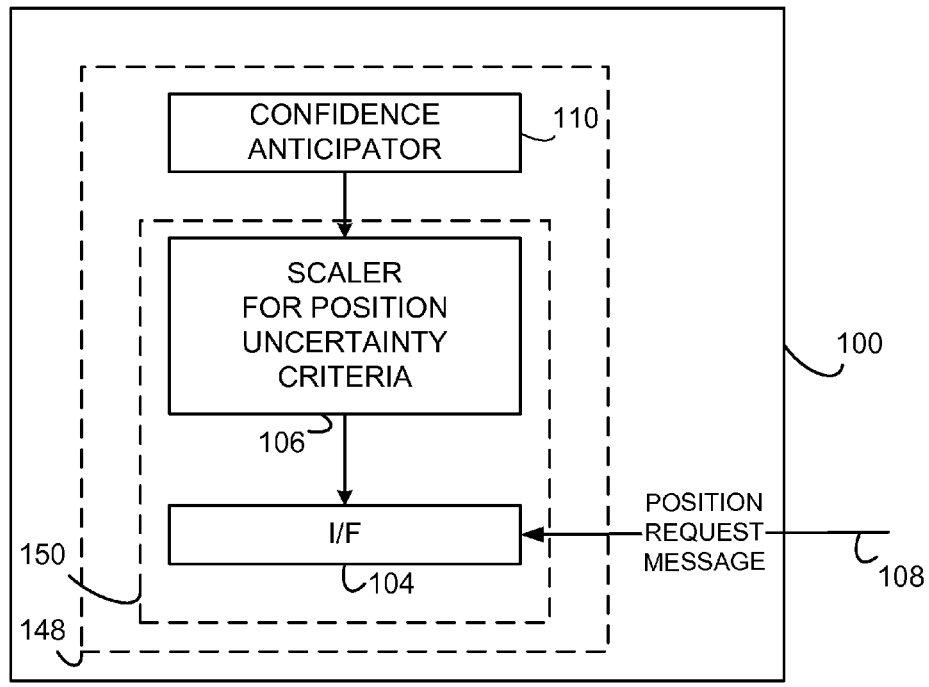
FIG. 8 is a diagrammatic view of a representative, generic position determination facilitating device according to an example embodiment.

Thus, an aspect the technology disclosed herein generally concerns network devices and methods which implement parameter scaling in conjunction with a position determination operation or procedure. FIG. 8 depicts a representative, generic network device 100 which implements parameter scaling. Device 100 comprises communication interface 104 and scaler 106. As described hereinafter, in some embodiments the device 100 can be a node, such as a radio network controller (RNC) or an evolved Serving Mobile Location Center (eSMLC) node. In other example embodiments the device 100 can be the very wireless terminal whose position is to be determined.

Figure 9:
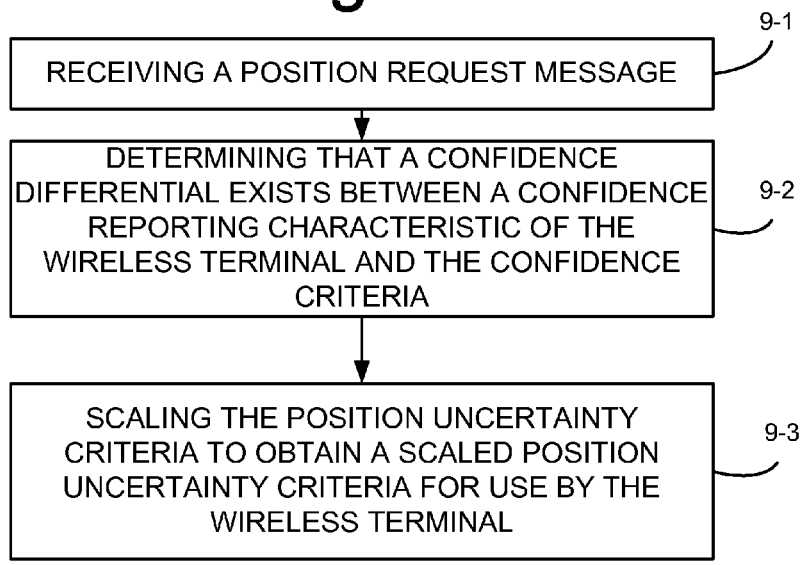
FIG. 9 is a flowchart illustrating representative, non-limiting acts or steps involved in a basic position determination facilitation method.

FIG. 9 illustrates representative, non-limiting acts or steps involved in a generic position determination method involving parameter scaling. Act 9-1 of the general method of FIG. 9 comprises the device 100 receiving (via communication interface 104) a position request message 108 (depicted by an arrow in FIG. 8). The position request message 108 may represent a message, a packet, a signal, or information structured and communicated in any other appropriate manner that requests determination of a position of a particular wireless terminal. The position request message 108 includes position uncertainty criteria and optionally includes confidence criteria for the position report which the wireless terminal is expected to return to the network. The confidence criteria is said to be optionally included since, in some embodiments, the confidence criteria can be included in the position request message but, in other embodiments (as in the case of WCDMA) can be configured in the communications device or received from another element of the system. In many situations, if not most situations, the confidence criteria is in a neighborhood of about 90% or greater. On the other hand, device 100 may know or at least anticipate that the confidence parameter that the wireless terminal will eventually send/return in its position report—the confidence reporting characteristic of the wireless terminal—will instead be significantly less. The device 100 may have knowledge of, or intelligently guess or estimate, the confidence parameter based on configured information, past history or other information which can be stored in or obtained from confidence anticipator 110. For example, the wireless terminal may return a confidence parameter of about 39% for a two dimensional case or a 20% confidence parameter for a three dimensional case.

Act 9-2 comprises the device 100 determining that a confidence differential exists between a confidence reporting characteristic of the wireless terminal and the confidence criteria. For example, for the three dimensional case the device 100 may determine a confidence differential of about 70% (e.g., 90%-20%).

As a result of the existence and determination confidence differential, act 9-3 comprises the device 100 scaling the position uncertainty criteria to obtain a scaled position uncertainty criteria for use by the wireless terminal. In particular, the scaler 106 is configured to scale the position uncertainty criteria to obtain the scaled position uncertainty criteria. Example scaling techniques are described hereinafter. For example, in an example implementation scaler 106 can scale the position uncertainty criteria in accordance with (e.g., in proportion or pre-set relation to) the confidence differential to obtain the scaled position uncertainty criteria. In general, the scaling transforms the requested inaccuracies (e.g., the position uncertainty criteria) in accordance with (e.g., to be consistent with) configured best estimates of the confidence values that are to be (or expected to be) reported by the terminals.

8.3.2 Scaling at Node Embodiments

Figure 10:
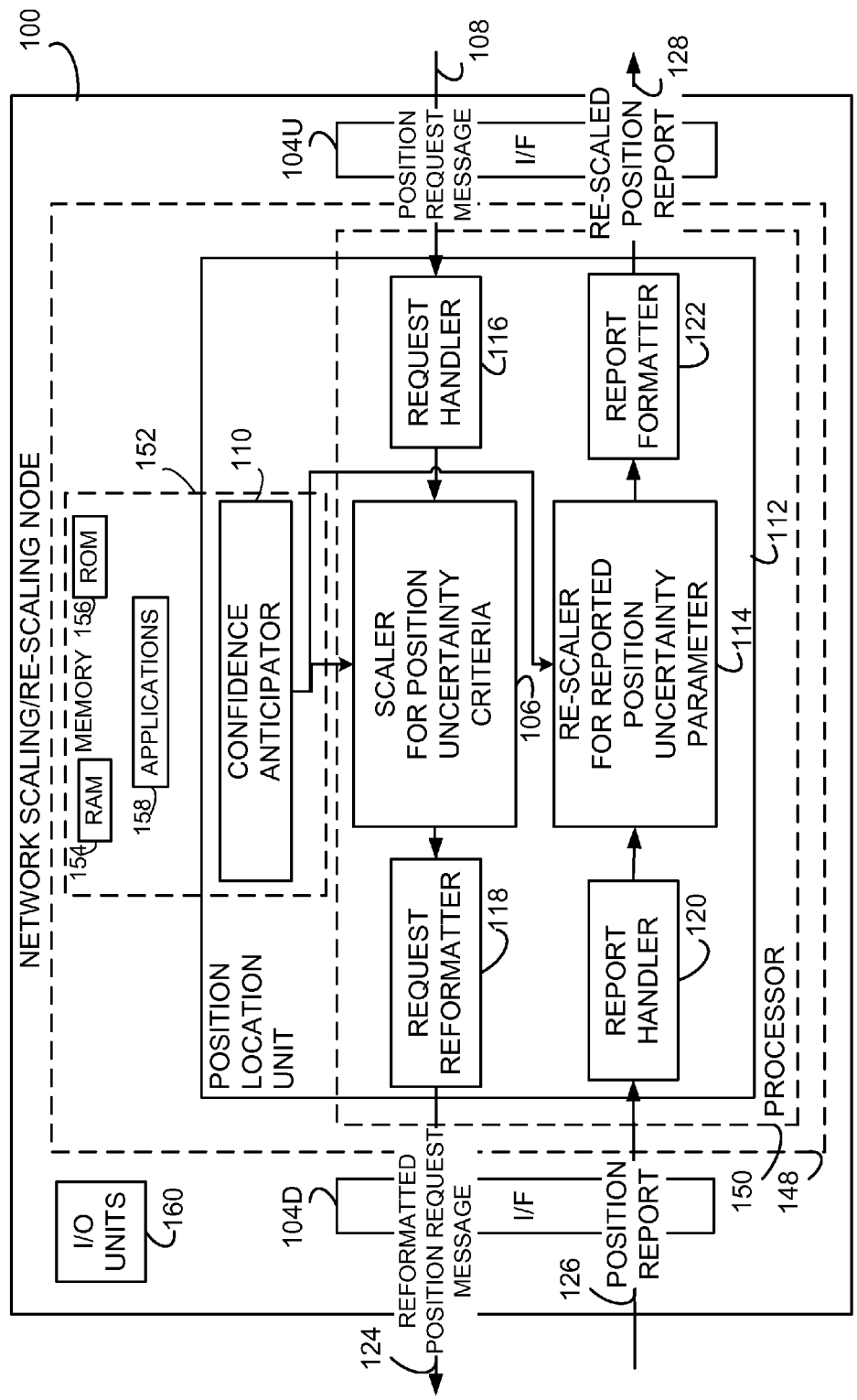
FIG. 10 is a diagrammatic view of a representative example embodiment of a position determination facilitating device which can take the form of a node (e.g. network node) such as a radio network controller (RNC) or an evolved Serving Mobile Location Center (eSMLC) node.

FIG. 10 generically illustrates example embodiments in which device 100(10) can be a node (e.g. network node) such as a radio network controller (RNC) or an evolved Serving Mobile Location Center (eSMLC) node. FIG. 10 shows the device 100(10) comprising two communications interfaces, including interface 104U through which communication occurs with, e.g., a client who requests the position determination of the wireless terminal, and interface 104D through which device 100(10) communicates (at least ultimately) with the wireless terminal.

FIG. 10 further shows device 100(10) as comprising position location unit 112. The position location unit 112 comprises scaler 106, re-scaler 114, and various message handlers and reformatters. For example, position location unit 112 comprises request handler 116, request reformatter 118; report handler 120, and report reformatter 122.

Figure 11:
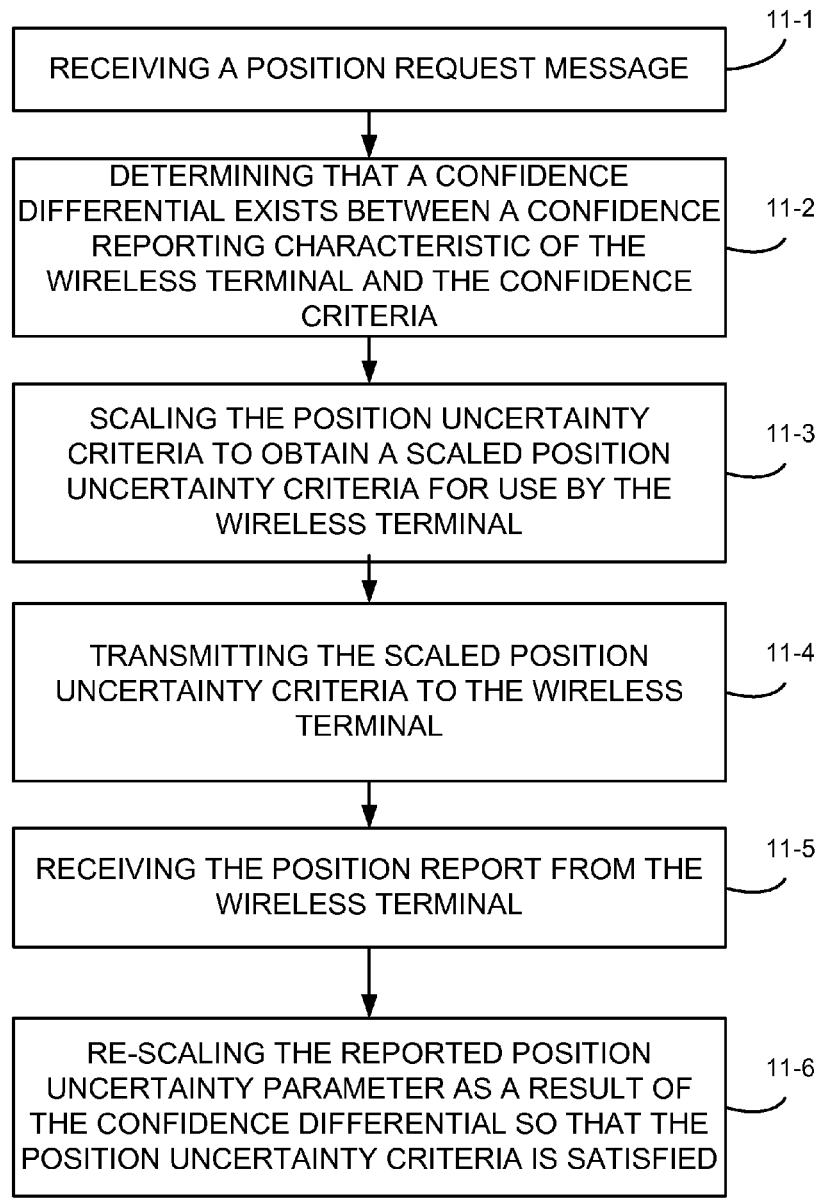
FIG. 11 illustrates representative, non-limiting acts or steps involved in a position determination method involving parameter scaling as performed by a node such as the node of FIG. 10.

FIG. 11 illustrates representative, non-limiting acts or steps involved in a position determination method involving parameter re-scaling which can be performed by a node such as that of device 100(10), and particularly by position location unit 112. The first three acts of the method of FIG. 11 resemble those of the generic method of FIG. 9 and hence are not described in detail. In this regard, act 11-1 comprises the device 100(10) receiving (via communication interface 104U) the position request message 108, which is processed by request handler 116. Act 11-2 comprises the position location unit 112 determining that the aforementioned confidence differential exists between a confidence reporting characteristic of the wireless terminal and the confidence criteria. Act 11-3 comprises the scaler 106 scaling the position uncertainty criteria to obtain scaled position uncertainty criteria for use by the wireless terminal.

Further acts of the node-performed method of FIG. 11 include act 11-4 through act 11-6. Act 11-4 comprises the request reformatter 118 preparing and the communication interface 104D transmitting the scaled position uncertainty criteria (e.g., scaled horizontal and vertical inaccuracies) to the wireless terminal. The scaled position uncertainty criteria can be included in reformatted position request message 124. The reformatted position request message 124 can resemble the position request message 108, but includes the scaled position uncertainty criteria rather than the original position uncertainty criteria as received in position request message 108.

In response to the reformatted position request message 124, the wireless terminal performs a procedure in which the wireless terminal determines or is apprised of its location/position. The procedure can be, for example, an A-GPS procedure or an A-GPS facilitated procedure. In conjunction with execution of the position determining procedure the wireless terminal sends a position report 126 to device 100 (3). For the reported wireless terminal the position report 126 typically includes information comprising, e.g., a reported position, a reported position uncertainty parameter, and a reported confidence parameter. The position report 126 is also known as the scaled position report 126 since the reported position uncertainty parameter is based on the scaled position uncertainty criteria. The reported confidence parameter of the position report 126 is based on the confidence reporting characteristic of the wireless terminal.

Act 11-5 comprises the device 100(10) receiving and the report handler 120 thereof processing the position report 126 from the wireless terminal. Act 11-6 comprises the re-scaler 114 re-scaling the reported position uncertainty parameter in a manner so that the position uncertainty criteria is satisfied. For example, in an example implementation the method further comprises re-scaling the reported position uncertainty parameter in accordance with (e.g., in proportion or pre-set relation to) the confidence differential. In other words, re-scaler 114 performs a shape conversion to re-scale up the reported uncertainty to correspond to the confidence value needed for reporting (e.g., the confidence criteria).

After the re-scaling of act 11-6 the device 100(10) sends re-scaled position report 128 to its client. The re-scaled position report 128 is prepared by report reformatter 122 and sent via communication interface 104U to the client. The re-scaled position report 128 includes the reported position, the re-scaled reported position uncertainty parameter, and the reported confidence parameter.

As understood from the foregoing, the device 100(10) receives the position uncertainty criteria and the confidence criteria in position request message 108. The device 100(10) makes an estimate or projection of the confidence parameter that the wireless terminal will report in connection with its 126. In other words, (as act 11-02) the device 100(10) determines or retrieves the confidence reporting characteristic of the wireless terminal. For example, the confidence criteria for determining the position the wireless terminal may be 95%, but the device 100(10) may guess or know (via confidence anticipator 110) that the wireless terminal will respond to it with a 39% confidence. If the device 100(10) were merely to download the required uncertainty criteria to the wireless terminal, the wireless terminal would (in conventional manner) provide the device 100(10) with its position parameter and its uncertainty parameter with the confidence reporting characteristic of the wireless terminal. If the device were then to scale up the uncertainty parameter in view of the mismatch between the confidence criteria and the confidence reporting characteristic of the wireless terminal, the initially requested quality of service may not be satisfied.

In order to avoid the foregoing, as act 11-3 the device 100(10) scales (e.g., scales down) the position uncertainty criteria (e.g., the horizontal and vertical inaccuracies) and downloads a scaled position uncertainty criteria to the wireless terminal. The device 100(10) thereafter receives (as act 11-5) the position report 126 from the wireless terminal with its reported uncertainty parameter and a confidence reporting characteristic of, for example, 39% confidence (for the two dimensional case). As act 11-6 the re-scaler 114 (re)scales (e.g., scales up) the reported uncertainty parameter to correspond to a confidence of 95%, so that the requesting client obtains essentially exactly the position and accuracy (uncertainty) that the client requires.

8.3.3 Scaling at Wireless Terminal Embodiments

Figure 12:
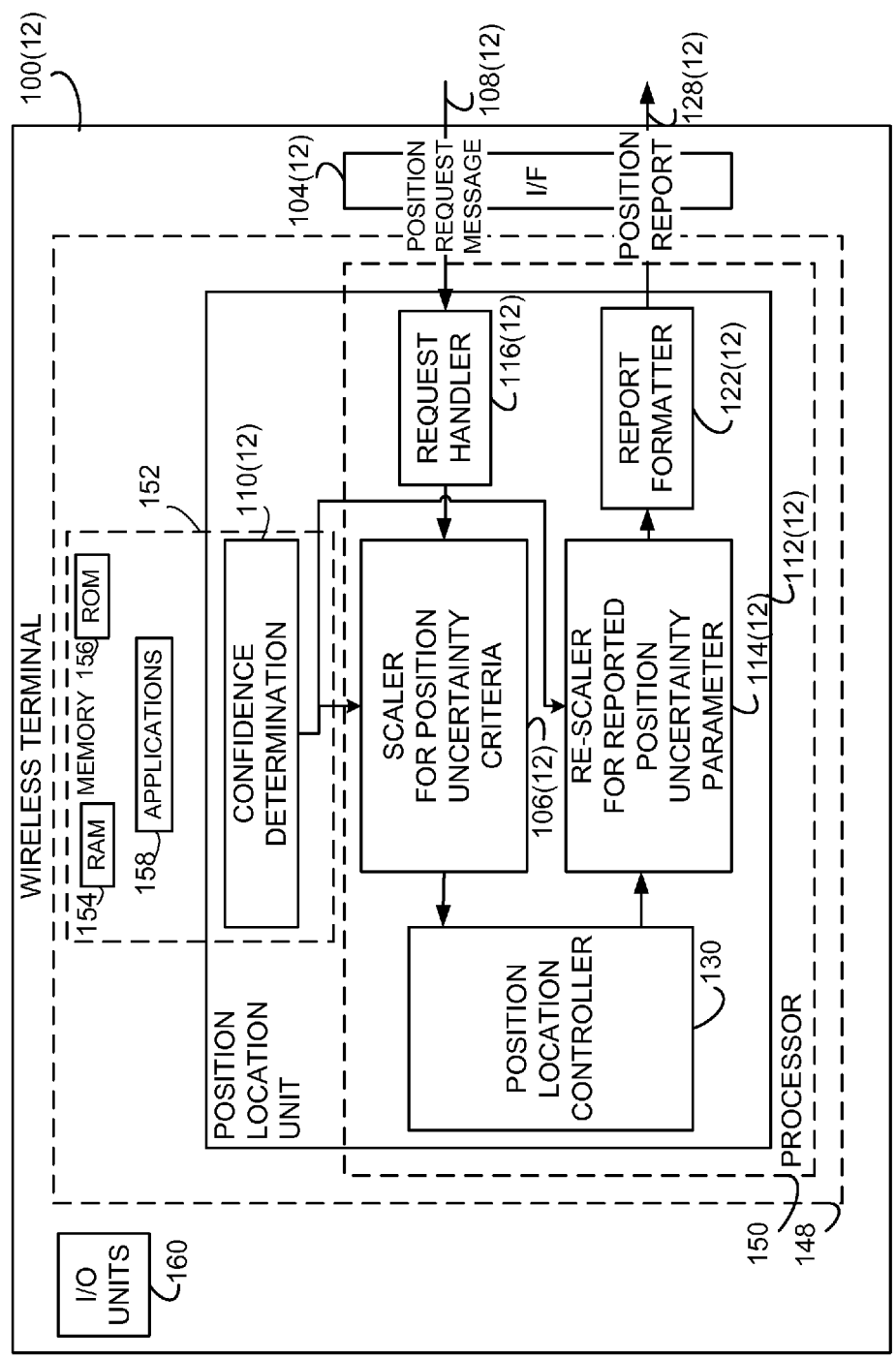
FIG. 12 is a diagrammatic view of a representative example embodiment of a position determination facilitating device which can take the form of the wireless terminal whose position is being sought.

FIG. 12 generically illustrates example embodiments in which device 100(12) can be the very wireless terminal whose position is being sought. FIG. 12 shows the device 100(12) as comprising communications interface 104(12) and position location unit 112(12). The wireless terminal 100(5) communicates through communication interface 104(12) over a radio or air interface to a radio access network, e.g., to a radio base station node or an eNodeB, for example. FIG. 12 further shows position location unit 112(5) as comprising scaler 106(12), confidence determination unit 110(12), re-scaler 114(12), request handler 116(12), report formatter 122(12), and position location controller 130. As explained below, the wireless terminal 100(12) is configured to use the scaled position uncertainty criteria in a position determination procedure (e.g., A-GPS procedure) to determine a position parameter, a position uncertainty parameter, and a confidence parameter. The scaled position uncertainty criteria is used the input for the A-GPS position determination since, e.g., the terminal will try and meet the scaled uncertainty criteria (it may, e.g., continue longer if this criterion is more difficult to meet). Stated differently, the reported position uncertainty parameter is determined as a function of the scaled position uncertainty criteria. The position uncertainty parameter which is output from the A-GPS determination can be but need not necessarily be the same as the scaled position uncertainty criteria (e.g., it may be less than or equal or larger.)

Figure 13:
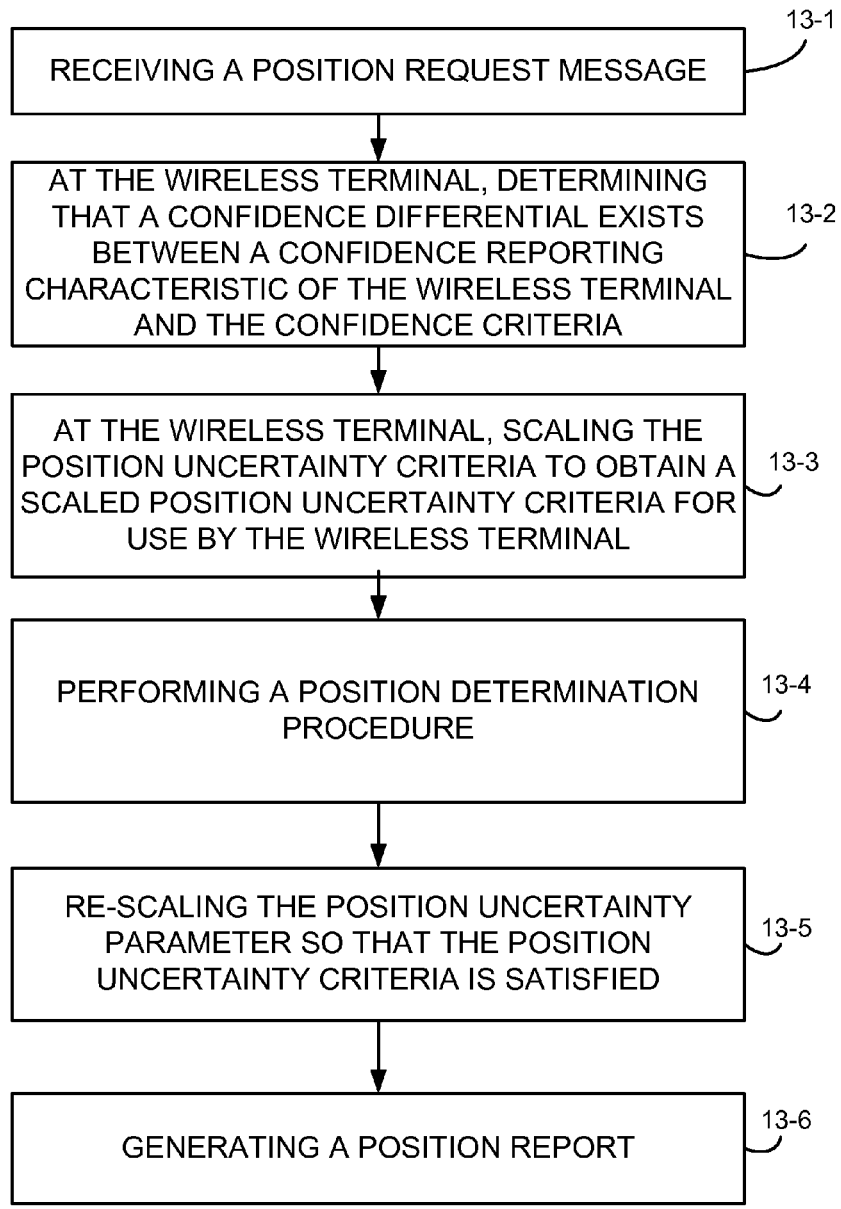
FIG. 13 illustrates representative, non-limiting acts or steps involved in a position determination method involving parameter scaling as performed by a wireless terminal such as the wireless terminal of FIG. 12.

FIG. 13 illustrates representative, non-limiting acts or steps involved in a position determination method involving parameter re-scaling which can be performed by a wireless terminal such as wireless terminal 100(12), and particularly by position location unit 112(12). The first three acts (act 13-1 through act 13-3) of the method of FIG. 12 resemble those of the generic method of FIG. 9 and hence are not described in detail, it being understood however that act 13-1 through 13-3 are performed at the wireless terminal 100(12) rather than at a network node. In this regard, act 13-1 comprises the wireless terminal 100(12) receiving (via communication interface 104(12)) the position request message 108(12), which is processed by request handler 116(12). Act 13-2 comprises the position location unit 112(12) determining that the aforementioned confidence differential exists between a confidence reporting characteristic of the wireless terminal and the confidence criteria. Act 13-3 comprises the scaler 106(12) scaling the position uncertainty criteria to obtain scaled position uncertainty criteria for use by the wireless terminal 100(12).

Act 13-4 of FIG. 13 comprises the position location unit 112(12) performing or participating in a position determination procedure and, as a result, determining at least a position parameter and a position uncertainty parameter as a function of the scaled position uncertainty criteria. Act 13-4 can comprise the position location unit 112(12) using the scaled position uncertainty criteria to determine a position parameter, a position uncertainty parameter, and a confidence parameter. The scaled position uncertainty criteria is used the input for the A-GPS position determination since, e.g., the terminal will try and meet the scaled uncertainty criteria (it may, e.g., continue longer if this criterion is more difficult to meet). The position uncertainty parameter which is output from the A-GPS determination can be but need not necessarily be the same as the scaled position uncertainty criteria (e.g., it may be less than or equal or larger.) Act 13-5 comprises the position location unit 112(12) of wireless terminal 100(12) re-scaling the position uncertainty parameter to form a re-scaled uncertainty parameter that satisfies the position uncertainty criteria. For example, in an example implementation the act 13-5 comprises re-scaling the reported position uncertainty parameter in accordance with (e.g., in proportion or pre-set relation to) the confidence differential. Act 13-6 comprises the wireless terminal 100(12) generating a position report (e.g., re-scaled position report 128) comprising the position parameter, the re-scaled uncertainty parameter, and the confidence parameter. The position report is generated, e.g., by report reformatter 122(12). The position report 128(12) is then sent to across the air or radio interface (via communication interface 104(12)) to the node that requested the position of the wireless terminal 100(12)).

8.3.3.1 Confidence for Certain Reporting Formats

In an example implementation, the wireless terminal is configured to generate the position report 128(12) in which a reported position of the wireless terminal is expressed in a polygon report format. The polygon report format includes an information element comprising the reported confidence parameter, as illustrated by confidence information element 74 of FIG. 7A. In another example implementation, the wireless terminal is configured to generate the position report 128(12) in which a reported position of the wireless terminal is expressed in an ellipsoid point with uncertainty circle report format. The ellipsoid point with uncertainty circle report format includes an information element comprising the reported confidence parameter, as illustrated by confidence information element 84 of FIG. 7B.

8.3.4 Machine Platform Embodiments

In some implementations various units or functionalities of devices 100 of each of the example embodiments described herein, including the position location unit and its constituent components, can be provided on or realized by a machine platform 148. As explained previously, the terminology "platform" is a way of describing how the functional units of device 100, device 100(10), and/or device 100(12) can be implemented or realized by machine. For this reason FIG. 8, FIG. 10, and FIG. 12 depict by broken lines the machine platform 148 as being implemented by one or more computer processors or controllers 150 as those terms are herein expansively defined. The processor(s) 150 can execute coded instructions in order and generate non-transitory signals to perform the various acts described herein. In such a computer implementation the device 100, device 100(10), and/or device 100(12) can comprise, in addition to a processor(s), memory section 152 (which in turn can comprise random access memory 154; read only memory 156; and application memory 158 (which stores, e.g., coded instructions which can be executed by the processor to perform acts described herein); and any other memory such as cache memory, for example). The device 100, device 100(10), and/or device 100(12) can also include various interfaces, such as a keypad; an audio input device (e.g. microphone); a visual input device (e.g., camera); visual output device (e.g., a display); and an audio output device (e.g., speaker). Other types of input/output devices can also be connected to or comprise the device 100, device 100(10), and/or device 100(12).

Another example platform suitable for the device 100, device 100(10), and/or device 100(12) is that of a hardware circuit, e.g., an application specific integrated circuit (ASIC) wherein circuit elements are structured and operated to perform the various acts described herein.

8.4 Scaling Techniques

As indicated above, in the various example embodiments the scaler 106 serves to scale the position uncertainty criteria (e.g., horizontal and vertical inaccuracies) to obtain the scaled position uncertainty criteria. For example, in an example implementation scaler 106 can scale the position uncertainty criteria in accordance with (e.g., in proportion or pre-set relation to) the confidence differential to obtain the scaled position uncertainty criteria. In general, the scaling transforms the requested inaccuracies (e.g., the position uncertainty criteria) in accordance with (e.g., to be consistent with) configured best estimates of the confidence values that are to be (or expected to be) reported by the terminals. Example scaling techniques are described below.

8.4.1 Two Dimensional Scaling Techniques

For scaling of the position uncertainty criteria in the two dimensional case the scaling is performed on the radius of an uncertainty circle. To derive the scaling, an uncertainty region determined by an ellipse is first used, then the circular uncertainty scaling is obtained as a special case by setting the semi-major axis of the ellipse equal to the semi-minor axis of the ellipse. The present discussion assumes that the uncertainty codes (e.g., the position uncertainty criteria), which in some example embodiments can be received over the RANAP interface (in the UMTS case), has been transformed to a horizontal (in)accuracy and a vertical (in)accuracy, respectively.

The result of an A-GPS report is associated with a Gaussian random error assumption. This follows since the time errors that give the ranges to the satellites can be assumed to be identically distributed. After linearizing the measurement equations, the strong law of large numbers can be applied to arrive at the conclusion that the error distribution is Gaussian.

Figure 14:
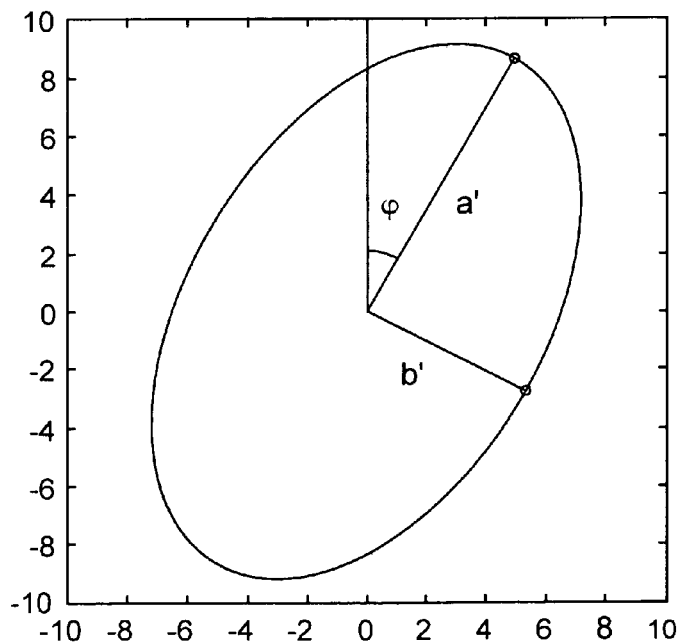
FIG. 14 is a diagrammatic view of geometry of an uncertainty ellipse.

The ellipse is parameterized with semi-major axis a', semi-minor axis b' and an angle $\phi$ relative to north, counted clockwise from the semi-major axis, as shown in FIG. 14. For symmetry reasons that the angle $\phi$ does not affect the final result. The value of $\phi$ is therefore taken to be 0 for the calculations below. The goal is hence to convert the ellipsoid confidence area at confidence level $C_{Initial}$ to a circular confidence area at confidence level $C_{Required}$.

In order to proceed, a' and b' are then transformed into the standard deviations of a normal distribution. This is done using the following calculations, where v is the scale factor that translates from one standard deviation to $C_{Initial}$ $$C_{Initial} = \iint_{\frac{x'^2}{a'^2}+\frac{y'^2}{b'^2}\le1} \frac{1}{2\pi(va')(vb')} e^{-\frac{1}{2}(x'\ y')^T\begin{pmatrix}(va')^2 & 0 \\ 0 & (vb')^2\end{pmatrix}^{-1}\begin{pmatrix}x'\\y'\end{pmatrix}} dx'dy'$$

$$= \iint_{x'^2+y'^2\le1} \frac{1}{2\pi(va')(vb')} e^{-\frac{1}{2}(xa'\ yb')^T\begin{pmatrix}(va')^2 & 0 \\ 0 & (vb')^2\end{pmatrix}^{-1}\begin{pmatrix}xa'\\yb'\end{pmatrix}}$$

$$\left|\begin{matrix}a' & 0 \\ 0 & b'\end{matrix}\right| dxdy$$

$$= \frac{1}{2\pi}\int_0^{2\pi}\int_0^1 \frac{1}{v^2} e^{-\frac{1}{2v^2}r^2} rdrd\zeta = 1-e^{-\frac{1}{2v^2}},$$

From the foregoing the transformations to semi-major and semi-minor axes corresponding to a unit standard deviation follow as:

$$a=a'/\sqrt{-2\ln(1-C_{initial})}$$

$$b=b'/\sqrt{-2\ln(1-C_{initial})}$$

Next, to obtain the scaling, the following expression is evaluated to compute or determine the uncertainty radius r' at the two dimensional covariance matrix level:

$$r=r'/\sqrt{-2\ln(1-C_{initial})}.$$

The above equations correspond to a confidence value of about 39%. The example calculation involves no scaling, v=1, and thus the expression 1−exp(−0.5)=0.39.

In case another scaled confidence value (e.g., another uncertainty radius r″) is required, the last equation can be used backwards to compute the sought quantity, i.e., $$r''=r'\sqrt{-2\ln(1-C_{prescale})}.$$

In other words, the equations above take a 95% uncertainty value down to a "guessed" 39% value, which is the "guess" of what the terminal does. In case it is desired to take a 95% uncertainty value down to a 45% guessed value, for example, the 95% uncertainty value can first be taken down to 39%, then applied backwards (changing division to multiplication and changing the confidence value in the formula).

8.4.2 Three Dimensional Scaling Techniques scaling for the three dimensional (3D) case parallels the two dimensional case (2D) in that a Gaussian 3D distribution is assumed and an ellipsoid is first considered, assuming the third principal axis being equal to the vertical inaccuracy (e.g., a vertical component of the position uncertainty criteria).

This transformation for the 3D case builds on the transformation of the previous sub-section for the 2D case. Care needs to be exercised since the transformation from 3D confidence values to a 3D unit covariance is different than in the 2D case. It is only at unit covariance confidence level that it is possible to extract the 2D covariance matrix of the ellipse from the 3D ellipsoid, and proceed as above. In order to derive the required relation, the calculations of the previous section for the 2D case replaced by the following calculations:

$$C_{Initial} = \iiint_{\frac{x'^2}{a'^2}+\frac{y'^2}{b'^2}+\frac{z'^2}{c'^2} \leq 1} \frac{1}{(2\pi)^{1.5} a'b'c'v^3} e^{-\frac{1}{2v^2}\left(\frac{x'^2}{a'^2}+\frac{y'^2}{b'^2}+\frac{z'^2}{c'^2}\right)} dx' dy' dz'$$

$$= \iiint_{x^2+y^2+z^2 \leq 1} \frac{1}{(2\pi)^{1.5} v^3} e^{-\frac{1}{2v^2}(x'^2+y^2+z^2)} dx dy dz$$

$$= \int_0^{2\pi} \int_{-\frac{\pi}{2}}^{\frac{\pi}{2}} \int_0^1 \frac{1}{(2\pi)^{1.5}} r^2 \cos(\psi) e^{-\frac{1}{2v^2}r^2} dr d\psi d\xi$$

$$= \text{erf}\left(\frac{1}{\sqrt{2}\,v}\right) - \frac{1}{v}\sqrt{\frac{2}{\pi}}\, e^{-\frac{1}{2v^2}},$$

In the preceding calculation c' denotes the vertical inaccuracy. The obtained equation can be solved numerically for a set of given $C_{Initial}$, resulting in a corresponding set of v, generating a table as exemplified by Table 3. Table 3 shows confidence values (fractions) and scale factors in the 3D case. In particular, Table 3 gives v for given $C_{Initial}$, from which the unit covariance ellipsoid axes follow as a=va', b=vb' and c=vc'. In order to obtain a high accuracy interpolation is utilized in the table. Also in this case, a backward interpolation can be used to compute scale factors other than for the unit covariance level.

8.4.3 One Dimensional Scaling Techniques

For the one dimensional scaling case the one dimensional (1D) Gaussian distribution is used for scaling corresponding to 68%. The case is applicable in the exceptional case were only vertical inaccuracy is pre-scaled. Example calculations for the 1D are as follows:

$$C_{Initial} = \int_{-r}^{r} \frac{1}{\sqrt{2\pi}\, vr} e^{-\frac{1x'^2}{2v^2 r^2}} dx' = \frac{1}{\sqrt{2\pi}\, v} \int_{-1}^{1} e^{-\frac{1x^2}{2v^2}} dx = \text{erf}\left(\frac{1}{\sqrt{2}\,v}\right)$$

The preceding equation cannot be solved analytically. Hence for the one dimensional case the solution can involve using a table such as Table 4. Table 4 thus shows confidence values (fractions) and scale factors in the 1D case.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

```
EllipsoidPointWithUncertaintyCircle ::= SEQUENCE {
    latitudeSign     LatitudeSign,
    degreesLatitude  DegreesLatitude,
    degreesLongitude DegreesLongitude,
    uncertainty      Uncertainty,
    confidence       Confidence
}
Polygon ::= SEQUENCE {
    polygonSequence PolygonSequence,
    confidence      Confidence
}
PolygonSequence ::= SEQUENCE (SIZE (3..15)) OF PolygonPoints
PolygonPoints ::= SEQUENCE {
    latitudeSign     LatitudeSign,
    degreesLatitude  DegreesLatitude,
    degreesLongitude DegreesLongitude
}
```

TABLE 2

| IE/Group Name | Presence | Range | IE type and reference | Semantics description |
|---|---|---|---|---|
| CHOICE Geographical Area | | | | |
| >Point | | | | Ellipsoid point |
| >>Geographical Coordinates | M | | 7.4.23 | |
| >Point With Uncertainty | | | | Ellipsoid point with uncertainty circle |
| >>Geographical Coordinates | M | | 7.4.23 | |

TABLE 2-continued

| IE/Group Name | Presence | Range | IE type and reference | Semantics description |
| --- | --- | --- | --- | --- |
| >>Uncertainty Code | M | | INTEGER (0 ... 127) | The uncertainty "r" expressed in meters is derived from the "Uncertainty Code" k by $r = 10 \times (1.1^k - 1)$ |
| >>Confidence | M | | INTEGER (0 ... 100) | In percentage |
| >Polygon | | | | List of Ellipsoid points |
| >>Polygon | | 1 ... <maxnoofPoints> | | |
| >>>Geographical Coordinates | M | | 7.4.23 | |
| >>Confidence | M | | INTEGER (0 ... 100) | In percentage |
| >Ellipsoid point with uncertainty Ellipse | | | | |
| >>Geographical Coordinates | M | | 7.4.23 | |
| >>Uncertainty Ellipse | M | | 7.4.24 | |
| >>Confidence | M | | INTEGER (0 ... 100) | In percentage |
| >Ellipsoid point with Altitude | | | | |
| >>Geographical Coordinates | M | | 7.4.23 | |
| >>Altitude and direction | M | | 7.4.22 | |
| >Ellipsoid point with altitude and uncertainty Ellipsoid | | | | |
| >>Geographical Coordinates | M | | 7.4.23 | |
| >>Altitude and direction | M | | 7.4.22 | |
| >>Uncertainty Ellipse | M | | 7.4.24 | |
| >>Uncertainty Altitude | M | | INTEGER (0 ... 127) | The uncertainty altitude "h" expressed in meters is derived from the "Uncertainty Altitude" k, by: $h = 45 \times (1.025^k - 1)$ |
| >>Confidence | M | | INTEGER (0 ... 100) | In percentage |
| >Ellipsoid Arc | | | | |
| >>Geographical Coordinates | M | | 7.4.23 | |
| >>Inner radius | M | | INTEGER (0 ... $2^{16}$ − 1) | The relation between the value (N) and the radius (r) in meters it describes is $5N \leq r < 5(N + 1)$, except for $N = 2^{16} - 1$ for which the range is extended to include all grater values of (r). |
| >>Uncertainty radius | M | | INTEGER (0 ... 127) | The uncertainty "r" is derived from the "Uncertainty radius" k by $r = 10 \times (1.1^k - 1)$ |
| >>Offset angle | M | | INTEGER (0 ... 179) | The relation between the value (N) and the angle (a) in degrees it describes is $2N \leq a < 2(N + 1)$ |
| >>Included angle | M | | INTEGER (0 ... 179) | The relation between the value (N) and the angle (a) in degrees it describes is $2N < a \leq 2(N + 1)$ |
| >>Confidence | M | | INTEGER (0 ... 100) | |

TABLE 3 confidence values (fractions) and scale factors in the 3D case

| $C_{Initial}$ | v |
|---|---|
| 0.9989 | 0.2500 |
| 0.9947 | 0.2806 |
| 0.9821 | 0.3150 |
| 0.9540 | 0.3536 |
| 0.9042 | 0.3969 |
| 0.8311 | 0.4454 |
| 0.7385 | 0.5000 |
| 0.6345 | 0.5612 |
| 0.5283 | 0.6300 |
| 0.4276 | 0.7071 |
| 0.3378 | 0.7937 |
| 0.2613 | 0.8909 |
| 0.1987 | 1.0000 |
| 0.1490 | 1.1225 |
| 0.1105 | 1.2599 |
| 0.0811 | 1.4142 |
| 0.0591 | 1.5874 |
| 0.0428 | 1.7818 |
| 0.0309 | 2.0000 |
| 0.0222 | 2.2449 |
| 0.0159 | 2.5198 |
| 0.0113 | 2.8284 |
| 0.0081 | 3.1748 |
| 0.0057 | 3.5636 |
| 0.0041 | 4.0000 |

TABLE 4 confidence values (fractions) and scale factors in the 1D case

| $C_{Initial}$ | v |
|---|---|
| 0.9957 | 0.3500 |
| 0.9760 | 0.4430 |
| 0.9255 | 0.5607 |
| 0.8412 | 0.7097 |
| 0.7344 | 0.8982 |
| 0.6209 | 1.1369 |
| 0.5129 | 1.4390 |
| 0.4170 | 1.8213 |
| 0.3356 | 2.3052 |
| 0.2682 | 2.9177 |
| 0.2134 | 3.6929 |
| 0.1694 | 4.6742 |
| 0.1342 | 5.9161 |
| 0.1062 | 7.4880 |
| 0.0840 | 9.4775 |
| 0.0664 | 11.9957 |
| 0.0525 | 15.1829 |
| 0.0415 | 19.2170 |
| 0.0328 | 24.3230 |
| 0.0259 | 30.7856 |
| 0.0205 | 38.9653 |
| 0.0162 | 49.3183 |
| 0.0128 | 62.4222 |
| 0.0101 | 79.0077 |
| 0.0080 | 100.0000 |

What is claimed is:

1. A communications device, comprising:
electronic circuitry configured to:
  receive a position request message requesting determination of a position of a wireless terminal, the position request message including a position uncertainty criteria;
  determine whether a confidence differential exists between a confidence reporting characteristic of the wireless terminal and a confidence criteria known to the communications device;
  as a result of determining that a confidence differential exists, scale the position uncertainty criteria to obtain a scaled position uncertainty criteria for use by the wireless terminal;
wherein the device is configured to receive from the wireless terminal information comprising a reported position uncertainty parameter and a reported confidence parameter, and to re-scale the reported position uncertainty parameter as a result of the confidence differential in a manner so that the position uncertainty criteria is satisfied, the reported position uncertainty parameter being based on the scaled position uncertainty criteria and the reported confidence parameter being based on the confidence reporting characteristic of the wireless terminal.

2. The communications device of claim 1, wherein the confidence criteria is either included in the position request message or configured in the communications device.

3. The communications device of claim 1, wherein the communications device is configured to scale the position uncertainty criteria in accordance with the confidence differential to obtain the scaled position uncertainty criteria.

4. The communications device of claim 1, wherein the communications device is configured to re-scale the reported position uncertainty parameter in accordance with the confidence differential.

5. The communications device of claim 1, wherein the communications device comprises a radio network controller (RNC) node.

6. The communications device of claim 1, wherein the communications device comprises an evolved Serving Mobile Location Center (eSMLC) node.

7. The communications device of claim 1, comprising a computer-implemented scaler configured to scale the position uncertainty criteria to obtain the scaled position uncertainty criteria for use by the wireless terminal.

8. A method of operating a communications network comprising:
  receiving at a network device a position request message configured to request determination of a position of a wireless terminal, the position request message including a position uncertainty criteria;
  determining that a confidence differential exists between a confidence reporting characteristic of the wireless terminal and a confidence criteria known to the network device; and, as a result of the confidence differential;
  scaling the position uncertainty criteria to obtain a scaled position uncertainty criteria for use by the wireless terminal;
  transmitting the scaled position uncertainty criteria to the wireless terminal;
  receiving from the wireless terminal information comprising a reported position uncertainty parameter and a reported confidence parameter, the reported position uncertainty parameter being based on the scaled position uncertainty criteria and the reported confidence parameter being based on the confidence reporting characteristic of the wireless terminal; and
  re-scaling the reported position uncertainty parameter as a result of the confidence differential in a manner so that the position uncertainty criteria is satisfied, the reported position uncertainty parameter being based on the scaled position uncertainty criteria and the reported confidence parameter being based on the confidence reporting characteristic of the wireless terminal.

9. The method of claim 8, further comprising at least one of obtaining the confidence criteria either from the position request message and reading the confidence criteria from a memory of the network device.

10. The method of claim 8, further comprising scaling the position uncertainty criteria in accordance with the confidence differential to obtain the scaled position uncertainty criteria.

11. The method of claim 8, re-scaling the reported position uncertainty parameter in accordance with the confidence differential.

12. The method of claim 8, further comprising performing the scaling at a radio network controller (RNC) node.

13. The method of claim 8, further comprising performing the scaling at an evolved Serving Mobile Location Center (eSMLC) node.

14. The method of claim 8, comprising using a computer-implemented scaler configured to scale the position uncertainty criteria to obtain the scaled position uncertainty criteria for use by the wireless terminal.

15. A communications device, comprising:
electronic circuitry configured to:
receive a position request message requesting determination of a position of a wireless terminal, the position request message including a position uncertainty criteria;
determine whether a confidence differential exists between a confidence reporting characteristic of the wireless terminal and a confidence criteria known to the communications device;
as a result of determining that a confidence differential exists, scale the position uncertainty criteria to obtain a scaled position uncertainty criteria for use by the wireless terminal;
wherein the communications device is the wireless terminal, and wherein the wireless terminal is configured to:
use the scaled position uncertainty to determine a position parameter, a position uncertainty parameter, and a confidence parameter;
re-scale the reported position uncertainty parameter to form a re-scaled uncertainty parameter that satisfies the position uncertainty criteria; and
generate a position report comprising the position parameter, the re-scaled uncertainty parameter, and the confidence parameter.

16. The communications device of claim 15, wherein the device is configured to use the scaled position uncertainty criteria as a reported position uncertainty parameter, and to re-scale the reported position uncertainty parameter as a result of the confidence differential in a manner so that the position uncertainty criteria is satisfied.

17. The communications device of claim 15, wherein the wireless terminal is configured to generate a position report wherein the position parameter is expressed in a polygon report format, and wherein the polygon report format includes an information element comprising the reported confidence parameter.

18. The communications device of claim 15, wherein the wireless terminal is configured to generate the position report wherein the position parameter is expressed in an ellipsoid point with uncertainty circle report format, and wherein the ellipsoid point with uncertainty circle report format includes an information element comprising the reported confidence parameter.

19. A method of operating a communications network comprising:
receiving at a network device a position request message configured to request determination of a position of a wireless terminal, the position request message including a position uncertainty criteria;
determining that a confidence differential exists between a confidence reporting characteristic of the wireless terminal and a confidence criteria known to the network device; and, as a result of the confidence differential;
scaling the position uncertainty criteria to obtain a scaled position uncertainty criteria for use by the wireless terminal;
using the scaled position uncertainty criteria to determine a position parameter, position uncertainty parameter, and a confidence parameter;
re-scaling the position uncertainty parameter to form a re-scaled uncertainty parameter that satisfies the position uncertainty criteria; and
generating a position report comprising the position parameter, the re-scaled uncertainty parameter, and the confidence parameter.

20. The method of claim 19, further comprising:
in the position report expressing the position parameter in a polygon report format; and
including in the polygon report format an information element comprising the reported confidence parameter.

21. The method of claim 19, further comprising:
in the position report expressing the position parameter in an ellipsoid point with uncertainty circle report format; and
including in the ellipsoid point with uncertainty circle report format an information element comprising the reported confidence parameter.

* * * * *

UNITED STATES PATENT AND TRADEMARK OFFICE
CERTIFICATE OF CORRECTION

PATENT NO. : 8,755,816 B2
APPLICATION NO. : 12/881611
DATED : June 17, 2014
INVENTOR(S) : Kangas et al.

It is certified that error appears in the above-identified patent and that said Letters Patent is hereby corrected as shown below:

In the Drawings

In Fig. 5, Sheet 5 of 12, delete "ACQUISTION ASSISTANCE DATA" and insert -- ACQUISITION ASSISTANCE DATA --, therefor.

In Fig. 6, Sheet 6 of 12, delete "LOCATINON" and insert -- LOCATION --, therefor.

In Fig. 7C, Sheet 7 of 12, delete "ACQUISTION ASSISTANCE DATA MESSAGE" and insert -- ACQUISITION ASSISTANCE DATA MESSAGE --, therefor.

In the Specification

Column 5, Line 11, delete "25,172" and insert -- 25.172 --, therefor.

Column 8, Line 4, delete "positioning Such" and insert -- positioning. Such --, therefor.

Column 8, Line 8, delete "terminal" and insert -- terminal. --, therefor.

Column 14, Line 54, delete "3GPP IS" and insert -- 3GPP TS --, therefor.

Column 15, Line 1, delete "preformed" and insert -- performed --, therefor.

Column 15, Line 36, delete "36.355" and insert -- 36.335 --, therefor.

Column 24, Line 57, delete "100 (12))." and insert -- 100 (12). --, therefor.

Signed and Sealed this
Third Day of March, 2015

Michelle K. Lee
*Deputy Director of the United States Patent and Trademark Office*

CERTIFICATE OF CORRECTION (continued)
U.S. Pat. No. 8,755,816 B2

Column 26, Line 61, in Equation, delete "$r''=r'\sqrt{-2\ln(1-C_{prescale})}.$" and insert -- $r'' = r'\sqrt{-2\ln(1-C_{prescaled})}.$ --, therefor.

Column 27, Line 6, delete "scaling" and insert -- Scaling --, therefor.